US010431099B2

(12) United States Patent
Stewart et al.

(10) Patent No.: US 10,431,099 B2
(45) Date of Patent: Oct. 1, 2019

(54) COLLISION AVOIDANCE SYSTEMS AND METHODS

(71) Applicant: FLIR Belgium BVBA, Meer (BE)

(72) Inventors: Peter A. Stewart, Winchester (GB); John Wellbelove, Portsmouth (GB); Mark Rivers, Hampshire (GB)

(73) Assignee: FLIR BELGIUM BVBA, Meer (BE)

(*) Notice: Subject to any disclaimer, the term of this patent is extended or adjusted under 35 U.S.C. 154(b) by 0 days.

(21) Appl. No.: 14/966,998

(22) Filed: Dec. 11, 2015

(65) Prior Publication Data

US 2016/0125739 A1 May 5, 2016

Related U.S. Application Data

(63) Continuation-in-part of application No. PCT/US2015/056786, filed on Oct. 21, 2015.

(60) Provisional application No. 62/213,577, filed on Sep. 2, 2015, provisional application No. 62/091,450, filed on Dec. 12, 2014, provisional application No. 62/069,961, filed on Oct. 29, 2014.

(51) Int. Cl.
*G08G 3/02* (2006.01)
*G01S 13/93* (2006.01)
*B63B 43/18* (2006.01)
*G01C 21/20* (2006.01)

(52) U.S. Cl.
CPC .............. *G08G 3/02* (2013.01); *B63B 43/18* (2013.01); *G01C 21/203* (2013.01); *G01S 13/9307* (2013.01)

(58) Field of Classification Search
CPC ........ G08G 3/02; G01C 21/203; G01C 23/00; G01S 13/9307; B63B 43/18

USPC .................................................. 701/21, 301
See application file for complete search history.

(56) References Cited

U.S. PATENT DOCUMENTS

| 2,671,206 A | | 3/1954 | Krause | |
| 3,952,303 A | * | 4/1976 | Watanabe | ............... G01S 13/24 342/112 |
| 3,989,216 A | | 11/1976 | Veatch | |
| 4,313,115 A | * | 1/1982 | O'Sullivan | ........... G01S 13/931 342/182 |

(Continued)

FOREIGN PATENT DOCUMENTS

| EP | 1148347 | 10/2001 |
| EP | 2626721 | 8/2013 |

(Continued)

*Primary Examiner* — Angelina Shudy
(74) *Attorney, Agent, or Firm* — Haynes and Boone, LLP

(57) ABSTRACT

Techniques are disclosed for systems and methods to generate image data based on avoidance areas for mobile targets and/or mobile structures. A collision avoidance system includes a logic device configured to communicate with a ranging sensor and/or a speed, position, and/or orientation sensor (SPOS) mounted to a mobile structure. The logic device may be configured to determine a projected course for a mobile target detected by the ranging sensor. The system may determine one or more avoidance areas based, at least in part, on the projected course for the mobile target and a speed, position, and/or orientation of the mobile structure detected by the SPOS. The system may generate image data based, at least in part, on the projected course, the one or more avoidance areas, and the detected orientation and/or position.

27 Claims, 12 Drawing Sheets

(56) References Cited

U.S. PATENT DOCUMENTS

| | | | |
|---|---|---|---|
| 4,982,924 A | 1/1991 | Havins | |
| 5,056,411 A * | 10/1991 | Baker | G05D 1/0206 89/41.07 |
| 5,142,649 A | 8/1992 | O'donnell | |
| 5,381,338 A * | 1/1995 | Wysocki | G01C 23/00 348/116 |
| 5,561,641 A | 10/1996 | Nishimori et al. | |
| 6,050,945 A | 4/2000 | Peterson et al. | |
| 6,201,482 B1 | 3/2001 | Schiefele | G08G 5/006 340/961 |
| 6,408,248 B1* | 6/2002 | Yancey, Jr. | B60Q 9/008 340/435 |
| 6,650,984 B1* | 11/2003 | Rao | B60R 21/013 342/42 |
| 6,806,622 B1 | 10/2004 | Schmidt et al. | |
| 7,542,376 B1 | 6/2009 | Thompson et al. | |
| 7,788,034 B2* | 8/2010 | Bui | G01C 21/20 701/1 |
| 7,818,120 B2* | 10/2010 | Poreda | G08G 3/02 342/357.25 |
| 7,865,277 B1* | 1/2011 | Larson | G05D 1/0206 114/221 A |
| 7,957,858 B1* | 6/2011 | Larson | G05D 1/0206 340/435 |
| 8,180,507 B2* | 5/2012 | Dokken | G01S 13/9307 340/903 |
| 8,209,090 B2* | 6/2012 | Arbitmann | B60W 10/06 701/300 |
| 8,296,001 B1* | 10/2012 | Kabel | G01C 21/22 340/988 |
| 8,378,276 B2* | 2/2013 | Lam | F41G 7/2206 244/3.1 |
| 8,577,552 B1* | 11/2013 | Smit | G01S 13/931 701/41 |
| 8,583,357 B2* | 11/2013 | Kita | G08G 3/02 340/961 |
| 8,805,601 B2* | 8/2014 | Aso | B60W 30/10 701/21 |
| 8,838,372 B2* | 9/2014 | Noda | G08G 1/166 340/903 |
| 9,071,641 B2* | 6/2015 | Sakka | H04L 67/18 |
| 9,157,746 B2* | 10/2015 | Bruce | G01C 21/20 |
| 9,453,912 B2* | 9/2016 | Kaida | G01S 7/10 |
| 9,746,556 B2* | 8/2017 | Nishiyama | G01S 13/9307 |
| 9,752,878 B2* | 9/2017 | Magson | G01C 21/00 |
| 2003/0028294 A1* | 2/2003 | Yanagi | G01S 7/22 701/21 |
| 2004/0019420 A1* | 1/2004 | Rao | B60R 21/013 701/45 |
| 2004/0090117 A1* | 5/2004 | Dudeck | B60T 7/22 303/191 |
| 2004/0158147 A1 | 8/2004 | Shifrin | |
| 2007/0222665 A1* | 9/2007 | Koeneman | G01S 13/9303 342/29 |
| 2007/0255470 A1* | 11/2007 | Diekhans | A01B 69/008 701/50 |
| 2008/0243372 A1* | 10/2008 | Bodin | G05D 1/0027 701/23 |
| 2008/0243389 A1* | 10/2008 | Inoue | G08G 1/165 701/301 |
| 2009/0105952 A1* | 4/2009 | Grace | G05D 1/0206 701/300 |
| 2009/0143951 A1* | 6/2009 | Takahashi | B60W 30/02 701/70 |
| 2009/0207020 A1* | 8/2009 | Garnier | G08B 21/12 340/541 |
| 2009/0271054 A1* | 10/2009 | Dokken | G01S 13/9307 701/21 |
| 2010/0292871 A1* | 11/2010 | Schultz | G01C 21/00 701/3 |
| 2011/0288714 A1* | 11/2011 | Flohr | G05D 1/0011 701/27 |
| 2012/0014220 A1* | 1/2012 | DePasqua | G01S 7/52004 367/88 |
| 2012/0035797 A1* | 2/2012 | Oobayashi | G05D 1/0214 701/23 |
| 2012/0101703 A1* | 4/2012 | Morita | A61G 5/041 701/70 |
| 2012/0130570 A1* | 5/2012 | Pease | B63H 25/04 701/21 |
| 2012/0130571 A1* | 5/2012 | Dunkle | G05D 1/0206 701/21 |
| 2012/0265380 A1* | 10/2012 | Kuwata | G05D 1/0206 701/21 |
| 2012/0316769 A1* | 12/2012 | Gagliardi | G08G 3/02 701/300 |
| 2013/0054138 A1* | 2/2013 | Clark | G01C 21/203 701/468 |
| 2014/0010049 A1 | 1/2014 | Proctor | |
| 2014/0037138 A1* | 2/2014 | Sato | G08G 1/166 382/103 |
| 2014/0180566 A1* | 6/2014 | Malhotra | G08G 3/02 701/300 |
| 2014/0218242 A1* | 8/2014 | Platzer | G01S 5/0027 342/454 |
| 2014/0229069 A1* | 8/2014 | Akiyama | B60T 7/12 701/41 |
| 2014/0350836 A1* | 11/2014 | Stettner | G01S 17/023 701/301 |
| 2014/0365045 A1* | 12/2014 | Canale | G01C 23/005 701/17 |
| 2015/0116143 A1* | 4/2015 | Nishiyama | G01S 13/538 342/25 A |
| 2016/0052515 A1* | 2/2016 | Choi | B60W 30/0953 701/1 |
| 2016/0161258 A1* | 6/2016 | Magson | G01C 21/00 701/467 |
| 2016/0162145 A1* | 6/2016 | Rivers | G01S 13/9307 715/769 |
| 2016/0275801 A1* | 9/2016 | Kopardekar | G08G 5/0043 |
| 2016/0299507 A1* | 10/2016 | Shah | G05D 1/0206 |
| 2016/0349754 A1* | 12/2016 | Mohr | G05D 1/0088 |
| 2017/0017237 A1* | 1/2017 | Tokuyama | G05D 1/024 |
| 2017/0018187 A1* | 1/2017 | Kim | G08G 1/166 |
| 2017/0067984 A1* | 3/2017 | Nakahama | G01S 7/24 |
| 2017/0193830 A1* | 7/2017 | Fragoso | G08G 5/0069 |
| 2017/0199274 A1* | 7/2017 | Sasabuchi | G01S 13/931 |
| 2017/0236422 A1* | 8/2017 | Naka | G08G 1/165 701/301 |
| 2018/0023954 A1* | 1/2018 | Rivers | G01C 21/203 |

FOREIGN PATENT DOCUMENTS

| | | |
|---|---|---|
| JP | 2012154791 | 8/2012 |
| WO | WO 2013/063515 | 5/2013 |
| WO | WO 2015/126678 | 8/2015 |

* cited by examiner

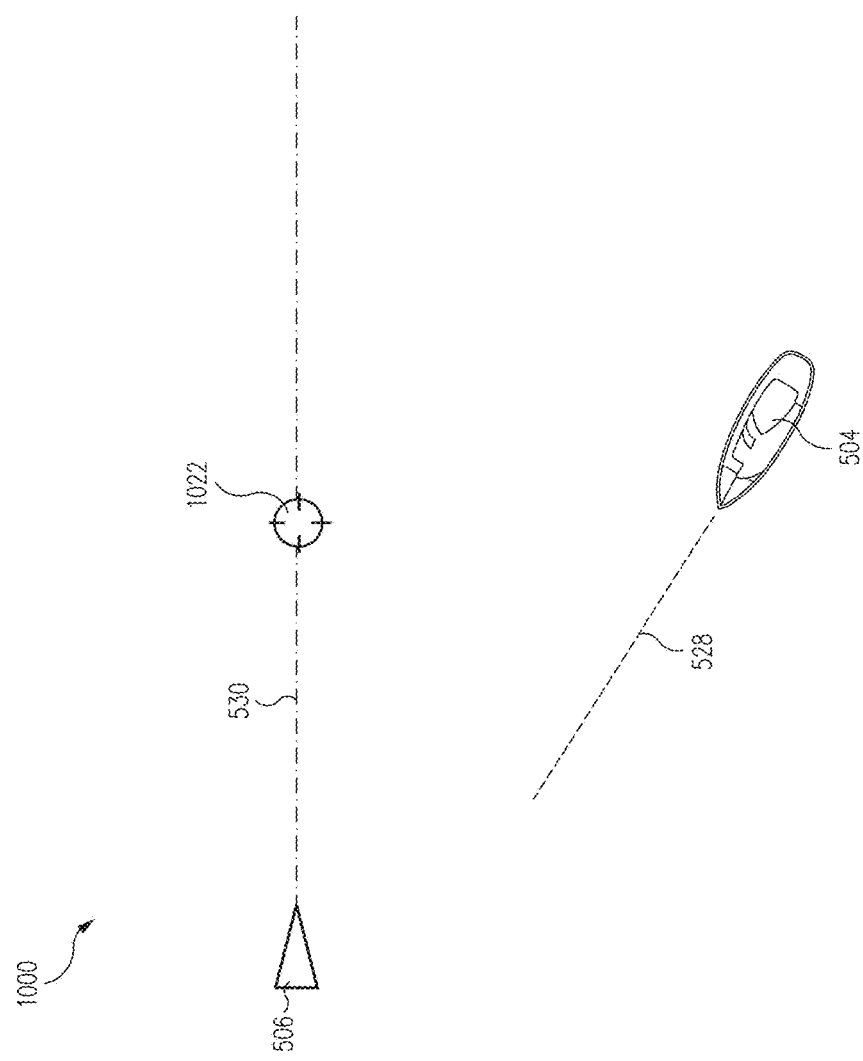

ically to marine systems and more particularly, for example, to
COLLISION AVOIDANCE SYSTEMS AND METHODS

CROSS-REFERENCE TO RELATED APPLICATIONS

This application claims priority to and the benefit of U.S. Provisional Patent Application No. 62/213,577 filed Sep. 2, 2015 and entitled "COLLISION AVOIDANCE SYSTEMS AND METHODS", which is hereby incorporated by reference in its entirety.

This application also claims priority to and the benefit of U.S. Provisional Patent Application No. 62/091,450 filed Dec. 12, 2014 and entitled "COLLISION AVOIDANCE SYSTEMS AND METHODS", which is hereby incorporated by reference in its entirety.

This application is a continuation-in-part of International Patent Application No. PCT/US2015/056786 filed Oct. 21, 2015 and entitled "PILOT DISPLAY SYSTEMS AND METHODS", which claims priority to and the benefit of U.S. Provisional Patent Application No. 62/069,961 filed Oct. 29, 2014 and entitled "PILOT DISPLAY SYSTEMS AND METHODS" and U.S. Provisional Patent Application No. 62/066,802 filed Oct. 21, 2014 and entitled "ENHANCED SONAR DISPLAY USING CW/FM PULSE OVERLAYS", all of which are hereby incorporated by reference in their entirety.

This application is related to International Patent Application No. PCT/US2015/015279 filed Feb. 10, 2015 and entitled "MODULAR SONAR TRANSDUCER ASSEMBLY SYSTEMS AND METHODS", which claim priority to and the benefit of U.S. Provisional Patent Application No. 61/943,170 filed Feb. 21, 2014 and entitled "MODULAR SONAR TRANSDUCER ASSEMBLY SYSTEMS AND METHODS", all of which are hereby incorporated by reference in their entirety.

This application is also related to International Patent Application No. PCT/US2015/032304 filed May 22, 2015 and entitled "MULTICHANNEL SONAR SYSTEMS AND METHODS", which claims priority to and the benefit of U.S. Provisional Patent Application No. 62/005,838 filed May 30, 2014 and entitled "MULTICHANNEL SONAR SYSTEMS AND METHODS", all of which are hereby incorporated by reference in their entirety.

TECHNICAL FIELD

One or more embodiments of the invention relate generally to marine systems and more particularly, for example, to systems and methods for providing collision avoidance imagery in a marine environment.

BACKGROUND

Various forms of marine technology may be used to assist in the navigation of a watercraft. For example, such technology may detect potential hazards to navigation, such as other watercraft, buoys, shallows, construction zones, drawbridge sweeps, and/or other hazards that can be detected through use of Automatic Identification System (AIS) transceivers, radar systems, sonar systems, and/or other ranging systems. However, conventional consumer marine systems are typically limited to providing relatively belated collision alerts after such targets or obstacles have drawn near.

Due to advancements in marine technology and manufacturing, watercraft use is becoming more prevalent, and a higher percentage of the watercraft are being piloted by novice users. As such, market and safety demands for sophisticated navigation assistance continue to rise. Therefore, there is a need in the art for improved methodologies to provide navigational information and strategy to a user, particularly in a marine environment.

SUMMARY

Techniques are disclosed for systems, methods, and devices to provide collision avoidance strategies and/or imagery that help users and/or autopilots operate mobile structures. A collision avoidance system may include one or more logic devices in communication with various sensors, such as a ranging sensor and a speed, position, and/or orientation sensor (SPOS) mounted to a mobile structure. One or more of the logic devices may be configured to determine a projected course for a mobile target detected by the ranging sensor, determine one or more avoidance areas based on the projected course, and generate image data including the projected course and the one or more avoidance areas. In some embodiments, the collision avoidance system may include a user interface, and the logic devices may be configured to render the image data via at least one display of the user interface.

In various embodiments, a collision avoidance system may include one or more orientation sensors, position sensors, speed sensors, ranging sensors, gyroscopes, accelerometers, and/or additional sensors, actuators, controllers, user interfaces, mapping systems, Automatic Identification System (AIS) transceivers, and/or other modules mounted to or in proximity to a vehicle or mobile structure. Each component of the system may be implemented with a logic device adapted to form one or more wired and/or wireless communication links for transmitting and/or receiving sensor signals, control signals, or other signals and/or data between the various components.

In one embodiment, a system may include a logic device configured to communicate with a ranging sensor and an SPOS mounted to a mobile structure. The logic device may be configured to determine a projected course for a mobile target detected by the ranging sensor; determine one or more avoidance areas based, at least in part, on the projected course for the mobile target and a speed, position, and/or orientation of the mobile structure provided by the SPOS; and generate image data based, at least in part, on the projected course, the one or more avoidance areas, and/or the speed, position, and/or orientation of the mobile structure.

In another embodiment, a method may include determining a projected course for a mobile target detected by a ranging sensor configured to be mounted to a mobile structure; determining one or more avoidance areas based, at least in part, on the projected course for the mobile target; and generating image data based, at least in part, on the projected course and the one or more avoidance areas.

In yet another embodiment, a system may include a logic device configured to communicate with a ranging sensor and an SPOS mounted to a mobile structure. The system may include means for determining a projected course for a mobile target detected by the ranging sensor; means for determining one or more avoidance areas based, at least in part, on the projected course for the mobile target and a speed, position, and/or orientation of the mobile structure provided by the SPOS; and/or means for generating image data based, at least in part, on the projected course, the one or more avoidance areas, and/or the speed, position, and/or orientation of the mobile structure.

The scope of the invention is defined by the claims, which are incorporated into this section by reference. A more complete understanding of embodiments of the invention will be afforded to those skilled in the art, as well as a realization of additional advantages thereof, by a consideration of the following detailed description of one or more embodiments. Reference will be made to the appended sheets of drawings that will first be described briefly.

BRIEF DESCRIPTION OF THE DRAWINGS

FIG. 10 illustrates image data generated by a collision avoidance system in accordance with an embodiment of the disclosure.

Embodiments of the invention and their advantages are best understood by referring to the detailed description that follows. It should be appreciated that like reference numerals are used to identify like elements illustrated in one or more of the figures.

DETAILED DESCRIPTION

In accordance with various embodiments of the present disclosure, collision avoidance imagery provided by the present collision avoidance system can be used to help operate a mobile structure. The collision avoidance system may include one or more controllers, user interfaces, sonar systems, radar systems, other ranging systems, and various orientation, position, and/or speed sensors that may be configured to determine and/or provide information about the state of the mobile structure and/or mobile targets remote from the mobile structure. For example, the sensors may be mounted to or within the mobile structure (e.g., a watercraft, aircraft, motor vehicle, and/or other mobile structure), or may be integrated with a portable imaging device and/or a ranging system. Embodiments of the present disclosure may be configured to produce avoidance area imagery and/or risk evaluations/strategies that are intuitive and relatively easy to interpret by a user operating a mobile structure, particularly during time critical maneuvering of the mobile structure.

Figure 1A:
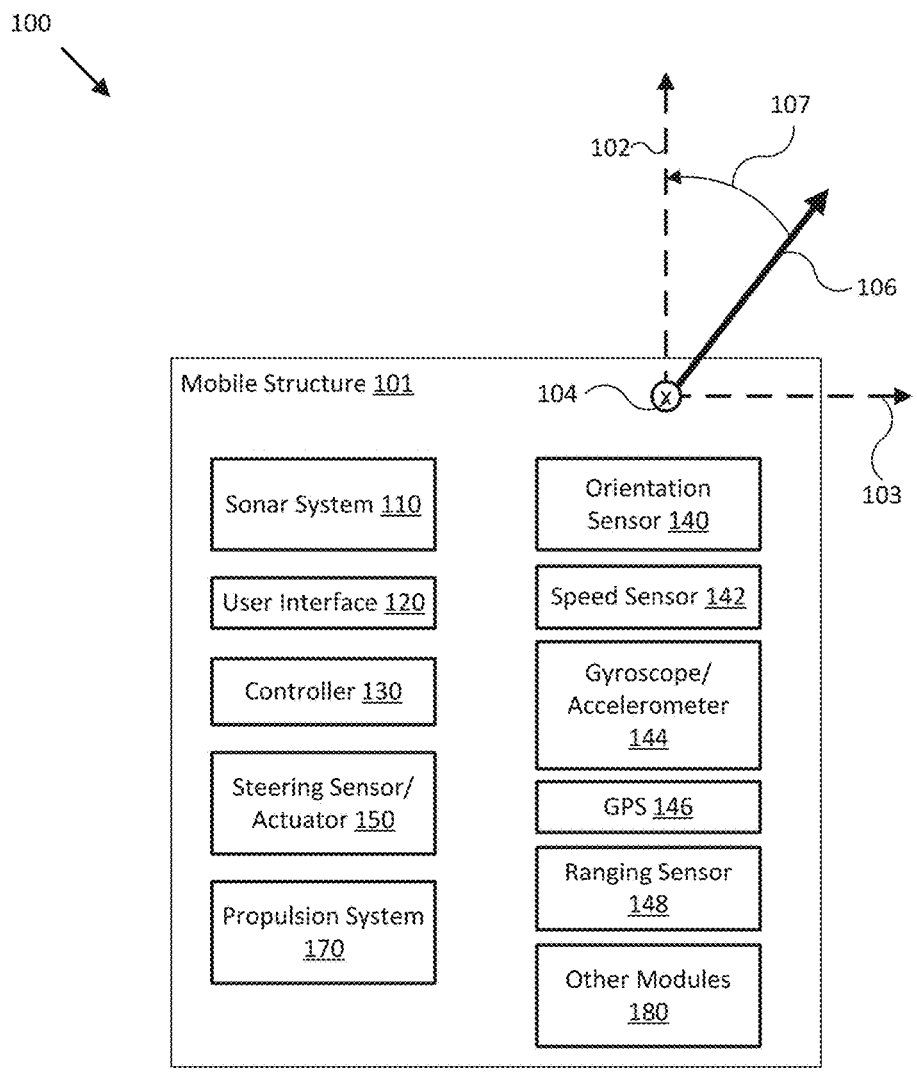
FIG. 1A illustrates a block diagram of a collision avoidance system in accordance with an embodiment of the disclosure.

FIG. 1A illustrates a block diagram of collision avoidance system 100 in accordance with an embodiment of the disclosure. In various embodiments, system 100 may be adapted to measure an orientation, a position, an acceleration, and/or a speed of mobile structure 101, sonar system 110, ranging system 148, and/or other elements of system 100. Furthermore, system 100 may be adapted to detect a mobile target remote from mobile structure 101 using, for example, ranging sensor 148, and determine various attributes of the mobile target including at least a projected course for the mobile target. System 100 may then use these measurements/detections to determine avoidance areas, clearance zones, avoidance courses, and/or other image data to help pilot mobile structure 101 to avoid a collision with a mobile target and/or other hazards. In some embodiments, system 100 may display resulting image data to a user through user interface 120, and/or use the avoidance areas, clearance zones, avoidance courses, and/or other image data to control operation of mobile structure 101, such as controlling steering actuator 150 and/or propulsion system 170 to pilot, e.g., steer, mobile structure 101 according to a desired heading, such as heading angle 107, for example.

In the embodiment shown in FIG. 1A, system 100 may be implemented to provide collision avoidance imagery for a particular type of mobile structure 101, such as a drone, a watercraft, an aircraft, a robot, a vehicle, and/or other types of mobile structures. In one embodiment, system 100 may include one or more of a sonar system 110, a user interface 120, a controller 130, an orientation sensor 140, a speed sensor 142, a gyroscope/accelerometer 144, a global positioning satellite system (GPS) 146, a ranging sensor 148, a steering sensor/actuator 150, a propulsion system 170, and one or more other sensors and/or actuators, such as other modules 180. In some embodiments, one or more of the elements of system 100 may be implemented in a combined housing or structure that can be coupled to mobile structure 101 and/or held or carried by a user of mobile structure 101.

Directions 102, 103, and 104 describe one possible coordinate frame of mobile structure 101 (e.g., for headings or orientations measured by orientation sensor 140 and/or angular velocities and accelerations measured by gyroscope and/or accelerometer 144). As shown in FIG. 1A, direction 102 illustrates a direction that may be substantially parallel to and/or aligned with a longitudinal axis of mobile structure 101, direction 103 illustrates a direction that may be substantially parallel to and/or aligned with a lateral axis of mobile structure 101, and direction 104 illustrates a direction that may be substantially parallel to and/or aligned with a vertical axis of mobile structure 101, as described herein. For example, a roll component of motion of mobile structure 101 may correspond to rotations around direction 102, a pitch component may correspond to rotations around direction 103, and a yaw component may correspond to rotations around direction 104.

Heading angle 107 may correspond to the angle between a projection of a reference direction 106 (e.g., the local component of the Earth's magnetic field) onto a horizontal plane (e.g., referenced to a gravitationally defined "down" vector local to mobile structure 101) and a projection of direction 102 onto the same horizontal plane. In some embodiments, the projection of reference direction 106 onto a horizontal plane (e.g., referenced to a gravitationally defined "down" vector) may be referred to as Magnetic North. In various embodiments, Magnetic North, a "down" vector, and/or various other directions, positions, and/or fixed or relative reference frames may define an absolute coordinate frame, for example, where directional measurements referenced to an absolute coordinate frame may be referred to as absolute directional measurements (e.g., an "absolute" orientation).

In some embodiments, directional measurements may initially be referenced to a coordinate frame of a particular sensor (e.g., a sonar transducer assembly or other, module of sonar system 110, ranging sensor 148, and/or user interface 120) and be transformed (e.g., using parameters for one or more coordinate frame transformations) to be referenced to an absolute coordinate frame and/or a coordinate frame of mobile structure 101. In various embodiments, an absolute coordinate frame may be defined and/or correspond to a coordinate frame with one or more undefined axes, such as a horizontal plane local to mobile structure 101 and referenced to a local gravitational vector but with an unreferenced and/or undefined yaw reference (e.g., no reference to Magnetic North).

Sonar system 110 may be implemented as one or more electrically and/or mechanically coupled controllers, transmitters, receivers, transceivers, signal processing logic devices, various electrical components, transducer elements of various shapes and sizes, multichannel transducers/transducer modules, transducer assemblies, assembly brackets, transom brackets, and/or various actuators adapted to adjust orientations of any of the components of sonar system 110, as described herein. For example, in various embodiments, sonar system 110 may be implemented and/or operated according to any of the systems and methods described in U.S. Provisional Patent Application 62/005,838 filed May 30, 2014 and entitled "MULTICHANNEL SONAR SYSTEMS AND METHODS", and/or U.S. Provisional Patent Application 61/943,170 filed Feb. 21, 2014 and entitled "MODULAR SONAR TRANSDUCER ASSEMBLY SYSTEMS AND METHODS", both of which are hereby incorporated by reference in their entirety. In other embodiments, sonar system 110 may be implemented according to other sonar system arrangements that can be used to detect objects within a water column and/or a floor of a body of water.

More generally, sonar system 110 may be configured to emit one, multiple, or a series of acoustic beams, receive corresponding acoustic returns, and convert the acoustic returns into sonar data and/or imagery, such as bathymetric data, water depth, water temperature, water column/volume debris, bottom profile, and/or other types of sonar data. Sonar system 110 may be configured to provide such data and/or imagery to user interface 120 for display to a user, for example, or to controller 130 for additional processing, as described herein.

In some embodiments, sonar system 110 may be implemented using a compact design, where multiple sonar transducers, sensors, and/or associated processing devices are located within a single transducer assembly housing that is configured to interface with the rest of system 100 through a single cable providing both power and communications to and from sonar system 110. In some embodiments, sonar system 110 may include orientation and/or position sensors configured to help provide two or three dimensional waypoints, increase sonar data and/or imagery quality, and/or provide highly accurate bathymetry data, as described herein.

In various embodiments, sonar system 110 may be implemented with optional orientation and/or position sensors (e.g., similar to orientation sensor 140, gyroscope/accelerometer 144, and/or GPS 146) that may be incorporated within the transducer assembly housing to provide three dimensional orientations and/or positions of the transducer assembly and/or transducer(s) for use when processing or post processing sonar data for display. The sensor information can be used to correct for movement of the transducer assembly between ensonifications to provide improved alignment of corresponding acoustic returns/samples, for example, and/or to generate imagery based on the measured orientations and/or positions of the transducer assembly. In other embodiments, an external orientation and/or position sensor can be used alone or in combination with an integrated sensor or sensors.

In embodiments where sonar system 110 is implemented with a position sensor, sonar system 110 may be configured to provide a variety of sonar data and/or imagery enhancements. For example, sonar system 110 may be configured to provide accurate positioning of sonar data and/or user-defined waypoints remote from mobile system 101. Similarly, sonar system 110 may be configured to provide accurate two and/or three dimensional aggregation and/or display of a series of sonar data; without position data, a sonar system typically assumes a straight track, which can cause image artifacts and/or other inaccuracies in corresponding sonar data and/or imagery. Additionally, when implemented with a position sensor and/or interfaced with a remote but relatively fixed position sensor (e.g., GPS 146), sonar system 110 may be configured to generate accurate and detailed bathymetric views of a floor of a body of water.

In embodiments where sonar system 110 is implemented with a speed, orientation, and/or position sensor (SPOS), sonar system 110 may be configured to store such information along with other sensor information (acoustic returns, temperature measurements, text descriptions, water depth, altitude, mobile structure speed, and/or other sensor and/or control information) available to system 100. In various embodiments, controller 130 may be configured to control steering sensor/actuator 150 and/or propulsion system 170 to adjust a position and/or orientation of mobile structure 101 to help ensure proper registration of a series of acoustic returns, sonar data, and/or sonar imagery.

Although FIG. 1A shows various sensors and/or other components of system 100 separate from sonar system 110, in other embodiments, any one or combination of sensors and components of system 100 may be integrated with a sonar assembly, an actuator, a transducer module, and/or other components of sonar system 110. For example, orientation sensor 140 may be integrated with a transducer module of sonar system 110 and be configured to provide measurements of an absolute and/or relative orientation (e.g., a roll, pitch, and/or yaw) of the transducer module to controller 130 and/or user interface 120, both of which may also be integrated with sonar system 110.

User interface 120 may be implemented as one or more of a display, a touchscreen, a keyboard, a mouse, a joystick, a knob, a steering wheel, a ship's wheel or helm, a yoke, and/or any other device capable of accepting user input and/or providing feedback to a user, such as information about a state of mobile structure 101 and/or a mobile target detected by sonar system 110 and/or ranging sensor 148. In some embodiments, user interface 120 may include multiple displays and/or touchscreens that may be mounted to mobile structure 101 and/or be portable and disposed in proximity to mobile structure 101 and/or surrounding areas. In various embodiments, user interface 120 may be adapted to provide user input (e.g., as a type of signal and/or sensor information) to other devices of system 100, such as controller 130. User interface 120 may also be implemented with one or more logic devices that may be adapted to execute instructions, such as software instructions, implementing any of the various processes and/or methods described herein. For example, user interface 120 may be adapted to form communication links, transmit and/or receive communications (e.g., sensor signals, control signals, sensor information, user input, and/or other information), determine various coordinate frames and/or orientations, determine parameters for one or more coordinate frame transformations, and/or perform coordinate frame transformations, for example, or to perform various other processes and/or methods.

In various embodiments, user interface 120 may be adapted to accept user input, for example, to form a communication link, to select a particular wireless networking protocol and/or parameters for a particular wireless networking protocol and/or wireless link (e.g., a password, an encryption key, a MAC address, a device identification number, a device operation profile, parameters for operation of a device, and/or other parameters), to select a method of processing sensor signals to determine sensor information, to adjust a position and/or orientation of an articulated sensor, and/or to otherwise facilitate operation of system 100 and devices within system 100. Once user interface 120 accepts a user input, the user input may be transmitted to other devices of system 100 over one or more communication links.

In one embodiment, user interface 120 may be adapted to receive a sensor or control signal (e.g., from orientation sensor 140 and/or steering sensor/actuator 150) over communication links formed by one or more associated logic devices, for example, and display sensor and/or other information corresponding to the received sensor or control signal to a user. In related embodiments, user interface 120 may be adapted to process sensor and/or control signals to determine sensor and/or other information. For example, a sensor signal may include an orientation, an angular velocity, an acceleration, a speed, and/or a position of mobile structure 101. In such embodiment, user interface 120 may be adapted to process the sensor signals to determine sensor information indicating an estimated and/or absolute roll, pitch, and/or yaw (attitude and/or rate), and/or a position or series of positions of mobile structure 101, for example, and display the sensor information as feedback to a user. In one embodiment, user interface 120 may be adapted to display a time series of various sensor information and/or other parameters as part of or overlaid on a graph or map, which may be referenced to a position and/or orientation of mobile structure 101. For example, user interface 120 may be adapted to display a time series of positions, headings, and/or orientations of mobile structure 101 and/or other elements of system 100 (e.g., a transducer assembly and/or module of sonar system 110, an element of ranging sensor 148) overlaid on a geographical map, which may include one or more graphs indicating a corresponding time series of actuator control signals, sensor information, and/or other sensor and/or control signals.

In some embodiments, user interface 120 may be adapted to accept user input including a user-defined target heading, route, and/or orientation for mobile structure 101, for example, and to generate control signals for steering sensor/actuator 150 and/or propulsion system 170 to cause mobile structure 101 to move according to the target heading, route, and/or orientation. In further embodiments, user interface 120 may be adapted to accept user input including a user-defined target attitude for an actuated device (e.g., sonar system 110, ranging sensor 148) coupled to mobile structure 101, for example, and to generate control signals for adjusting an orientation of the actuated device according to the target attitude. More generally, user interface 120 may be adapted to display sensor information to a user, for example, and/or to transmit sensor information and/or user input to other user interfaces, sensors, or controllers of system 100, for instance, for display and/or further processing. In one embodiment, user interface 120 may be integrated with one or more sensors (e.g., imaging modules, position and/or orientation sensors, other sensors) and/or be portable (e.g., such as a portable touch display or smart phone, for example, or a wearable user interface) to facilitate user interaction with various systems of mobile structure 101.

Controller 130 may be implemented as any appropriate logic device (e.g., processing device, microcontroller, processor, application specific integrated circuit (ASIC), field programmable gate array (FPGA), memory storage device, memory reader, or other device or combinations of devices) that may be adapted to execute, store, and/or receive appropriate instructions, such as software instructions implementing a control loop for controlling various operations of sonar system 110, steering sensor/actuator 150, mobile structure 101, and/or system 100, for example. Such software instructions may also implement methods for processing sensor signals, determining sensor information, providing user feedback (e.g., through user interface 120), querying devices for operational parameters, selecting operational parameters for devices, or performing any of the various operations described herein (e.g., operations performed by logic devices of various elements of system 100).

In addition, a machine readable medium may be provided for storing non-transitory instructions for loading into and execution by controller 130. In these and other embodiments, controller 130 may be implemented with other components where appropriate, such as volatile memory, non-volatile memory, one or more interfaces, and/or various analog and/or digital components for interfacing with devices of system 100. For example, controller 130 may be adapted to store sensor signals, sensor information, parameters for coordinate frame transformations, calibration parameters, sets of calibration points, and/or other operational parameters, over time, for example, and provide such stored data to a user using user interface 120. In some embodiments, controller 130 may be integrated with one or more user interfaces (e.g., user interface 120), and, in one embodiment, may share a communication module or modules. As noted herein, controller 130 may be adapted to execute one or more control loops for actuated device control, steering control (e.g., using steering sensor/actuator 150) and/or performing other various operations of mobile structure 101 and/or system 100. In some embodiments, a control loop may include processing sensor signals and/or sensor information in order to control one or more operations of sonar system 110, ranging sensor 148, mobile structure 101, and/or system 100.

Orientation sensor 140 may be implemented as one or more of a compass, float, accelerometer, and/or other digital or analog device capable of measuring an orientation of mobile structure 101 (e.g., magnitude and direction of roll, pitch, and/or yaw, relative to one or more reference orientations such as gravity and/or Magnetic North) and providing such measurements as sensor signals that may be communicated to various devices of system 100. In some embodiments, orientation sensor 140 may be adapted to provide heading measurements for mobile structure 101. In other embodiments, orientation sensor 140 may be adapted to provide roll, pitch, and/or yaw rates for mobile structure 101 (e.g., using a time series of orientation measurements). Orientation sensor 140 may be positioned and/or adapted to make orientation measurements in relation to a particular coordinate frame of mobile structure 101, for example.

Speed sensor 142 may be implemented as an electronic pitot tube, metered gear or wheel, water speed sensor, wind speed sensor, a wind velocity sensor (e.g., direction and magnitude) and/or other device capable of measuring or determining a linear speed of mobile structure 101 (e.g., in a surrounding medium and/or aligned with a longitudinal axis of mobile structure 101) and providing such measurements as sensor signals that may be communicated to various devices of system 100. In some embodiments, speed sensor 142 may be adapted to provide a velocity (e.g., direction and magnitude) of a surrounding medium relative to sensor 142 and/or mobile structure 101.

Gyroscope/accelerometer 144 may be implemented as one or more electronic sextants, semiconductor devices, integrated chips, accelerometer sensors, accelerometer sensor systems, or other devices capable of measuring angular velocities/accelerations and/or linear accelerations (e.g., direction and magnitude) of mobile structure 101 and providing such measurements as sensor signals that may be communicated to other devices of system 100 (e.g., user interface 120, controller 130). Gyroscope/accelerometer 144 may be positioned and/or adapted to make such measurements in relation to a particular coordinate frame of mobile structure 101, for example. In various embodiments, gyroscope/accelerometer 144 may be implemented in a common housing and/or module to ensure a common reference frame or a known transformation between reference frames.

GPS 146 may be implemented as a global positioning satellite receiver, global navigation satellite system (GNSS/GLONASS) and/or receiver, and/or other device capable of determining absolute and/or relative position of mobile structure 101 (e.g., or an element of mobile structure 101, such as sonar system 110, ranging sensor 148, and/or user interface 120) based on wireless signals received from space-born and/or terrestrial sources, for example, and capable of providing such measurements as sensor signals that may be communicated to various devices of system 100. In some embodiments, GPS 146 may be adapted to determine a velocity, speed, and/or yaw rate (e.g., a turning rate) of mobile structure 101 (e.g., using a time series of position measurements), such as an absolute velocity and/or a yaw component of an angular velocity of mobile structure 101. In various embodiments, one or more logic devices of system 100 may be adapted to determine a calculated speed of mobile structure 101 and/or a computed yaw component of the angular velocity from such sensor information.

Ranging sensor/system 148 may be implemented as one or more of an acoustic sensor, a sonar sensor, a sonic ranging sensor, an ultrasonic ranging sensor, a magnetometer, a radar sensor, a light detection and ranging (LIDAR) sensor, a Doppler sensor, an Automatic Identification System (AIS) transmitter/receiver/transponder, an Aircraft Communications Addressing and Reporting System (ACARS) transmitter/receiver/transponder, and/or other sensors or systems configured to detect a mobile target, a projected course of a mobile target, and/or other characteristics of a mobile target remote from mobile structure 101. In embodiments where ranging sensor 148 is implemented as or with an AIS and/or ACARS receiver, for example, ranging sensor 148 may be configured to receive AIS signals and/or data and provide such ranging data to user interface 120 for display to a user, for example, or to controller 130 for additional processing, as described herein.

In some embodiments, ranging sensor 148 may be implemented as a radar system configured to detect one or more absolute and/or relative positions and/or a cross section (e.g., a radar cross section) of a mobile target. A cross section of a mobile target may be based on a return signal and/or signals corresponding to a shape, form, and/or profile of the mobile target as sensed against a relatively distant background. For example, a cross section of a mobile target sensed by ranging sensor/system 148 may include an outline of a profile of the mobile target in one or two dimensions and a substantially homogenous ranging signal response within the profile, as seen and/or resolved by ranging sensor/system 148. In various embodiments, one or more orientations of a mobile target may be determined based on successive relative positions of the mobile target, for example, and/or a detected cross section of the mobile target. For example, a relatively narrow cross section and/or successive relative positions in a radial direction may indicate the mobile target is oriented with its bow or stern aimed at mobile structure 101. In such embodiments, the orientation of the mobile target, including a heading and/or a heading angle, may be determined accordingly.

More generally, ranging sensor 148 may be configured to emit one, multiple, or a series of ranging signals, receive corresponding ranging returns, and/or convert the ranging returns into ranging data and/or imagery, such as radar data (e.g., relative position and/or size/presence), visible spectrum and/or infrared image data, and/or other types of ranging data. Ranging sensor 148 may be configured to provide such data and/or imagery to user interface 120 for display to a user, for example, or to controller 130 for additional processing, as described herein.

In some embodiments, ranging sensor 148 may be implemented using a compact design, where multiple sensors and/or associated processing devices are located within a single assembly housing that is configured to interface with the rest of system 100 through a single cable providing both power and communications to and from ranging sensor 148. In some embodiments, ranging sensor 148 may include orientation and/or position sensors configured to help provide two or three dimensional waypoints, increase ranging data and/or imagery quality, and/or provide highly accurate ranging data, as described herein.

In various embodiments, ranging sensor 148 may be implemented with optional orientation and/or position sensors (e.g., similar to orientation sensor 140, gyroscope/accelerometer 144, and/or GPS 146) that may be incorporated within its assembly housing to provide three dimensional orientations and/or positions of ranging sensor 148 for use when processing or post processing ranging data for display. The sensor information can be used to correct for movement of ranging sensor 148 between ensonifications/ranging signal emissions to provide improved alignment of corresponding returns/samples, for example, and/or to generate imagery based on the measured orientations and/or positions of ranging sensor 148. In other embodiments, an external orientation and/or position sensor can be used alone or in combination with an integrated sensor or sensors.

In embodiments where ranging sensor 148 is implemented with a speed, orientation, and/or position sensor (SPOS), ranging sensor 148 may be configured to store such information along with other sensor information (ranging signal returns, temperature measurements, text descriptions, distances/headings to target, altitude, mobile structure speed, and/or other sensor and/or control information) available to system 100. In various embodiments, controller 130 may be configured to control steering sensor/actuator 150 and/or propulsion system 170 to adjust a position and/or orientation of mobile structure 101 to help ensure proper registration of a series of ranging returns, for example, or to avoid collision with a detected hazard or target.

Although FIG. 1A shows various sensors and/or other components of system 100 separate from ranging sensor 148, in other embodiments, any one or combination of sensors and components of system 100 may be integrated with a sensor, an actuator, and/or other components of ranging sensor 148. For example, orientation sensor 140 may be integrated with a sensor of ranging sensor 148 and be configured to provide measurements of an absolute and/or relative orientation (e.g., a roll, pitch, and/or yaw) of the sensor to controller 130 and/or user interface 120, both of which may also be integrated with ranging sensor 148.

Steering sensor/actuator 150 may be adapted to physically adjust a heading of mobile structure 101 according to one or more control signals, user inputs, and/or stabilized attitude estimates provided by a logic device of system 100, such as controller 130. Steering sensor/actuator 150 may include one or more actuators and control surfaces (e.g., a rudder or other type of steering or trim mechanism) of mobile structure 101, and may be adapted to physically adjust the control surfaces to a variety of positive and/or negative steering angles/positions.

Propulsion system 170 may be implemented as a propeller, turbine, or other thrust-based propulsion system, a mechanical wheeled and/or tracked propulsion system, a sail-based propulsion system, and/or other types of propulsion systems that can be used to provide motive force to mobile structure 101. In some embodiments, propulsion system 170 may be non-articulated, for example, such that the direction of motive force and/or thrust generated by propulsion system 170 is fixed relative to a coordinate frame of mobile structure 101. Non-limiting examples of non-articulated propulsion systems include, for example, an inboard motor for a watercraft with a fixed thrust vector, for example, or a fixed aircraft propeller or turbine. In other embodiments, propulsion system 170 may be articulated, for example, and may be coupled to and/or integrated with steering sensor/actuator 150, for example, such that the direction of generated motive force and/or thrust is variable relative to a coordinate frame of mobile structure 101. Non-limiting examples of articulated propulsion systems include, for example, an outboard motor for a watercraft, an inboard motor for a watercraft with a variable thrust vector/port (e.g., used to steer the watercraft), a sail, or an aircraft propeller or turbine with a variable thrust vector, for example.

Other modules 180 may include other and/or additional sensors, actuators, communications modules/nodes, and/or user interface devices used to provide additional environmental information of mobile structure 101, for example. In some embodiments, other modules 180 may include a humidity sensor, a wind and/or water temperature sensor, a barometer, a radar system, a light detection and ranging (LIDAR) system, a visible spectrum camera, an infrared camera, and/or other environmental sensors providing measurements and/or other sensor signals that can be displayed to a user and/or used by other devices of system 100 (e.g., controller 130) to provide operational control of mobile structure 101 and/or system 100 that compensates for environmental conditions, such as wind speed and/or direction, swell speed, amplitude, and/or direction, and/or an object in a path of mobile structure 101, for example.

In some embodiments, other modules 180 may include one or more actuated devices (e.g., spotlights, infrared illuminators, cameras, radars, LIDARs, sonars, and/or other actuated devices) coupled to mobile structure 101, where each actuated device includes one or more actuators adapted to adjust an orientation of the device, relative to mobile structure 101, in response to one or more control signals (e.g., provided by controller 130). In still further embodiments, other modules 180 may include one or more sensors configured to measure a state of mobile structure 101 and/or an elements or subsystem of mobile structure 101, such as a fuel-usage sensor, one or more user proximity sensors, a light level sensor, an AIS transmitter and/or receiver, other types of target sensors, and/or other state sensors for mobile structure 101.

In general, each of the elements of system 100 may be implemented with any appropriate logic device (e.g., processing device, microcontroller, processor, application specific integrated circuit (ASIC), field programmable gate array (FPGA), memory storage device, memory reader, or other device or combinations of devices) that may be adapted to execute, store, and/or receive appropriate instructions, such as software instructions implementing a method for providing sonar data and/or imagery, for example, or for transmitting and/or receiving communications, such as sensor signals, sensor information, and/or control signals, between one or more devices of system 100. In one embodiment, such method may include instructions to receive an orientation, acceleration, position, and/or speed of mobile structure 101 and/or another element of system 100 from various sensors, to determine an element orientation adjustment (e.g., relative to a desired orientation) from the sensor signals, and/or to control an actuator to adjust an element orientation accordingly, for example, as described herein. In a further embodiment, such method may include instructions for forming one or more communication links between various devices of system 100.

In addition, one or more machine readable mediums may be provided for storing non-transitory instructions for loading into and execution by any logic device implemented with one or more of the devices of system 100. In these and other embodiments, the logic devices may be implemented with other components where appropriate, such as volatile memory, non-volatile memory, and/or one or more interfaces (e.g., inter-integrated circuit (I2C) interfaces, mobile industry processor interfaces (MIPI), joint test action group (JTAG) interfaces (e.g., IEEE 1149.1 standard test access port and boundary-scan architecture), and/or other interfaces, such as an interface for one or more antennas, or an interface for a particular type of sensor).

Each of the elements of system 100 may be implemented with one or more amplifiers, modulators, phase adjusters, beamforming components, digital to analog converters (DACs), analog to digital converters (ADCs), various interfaces, antennas, transducers, and/or other analog and/or digital components enabling each of the devices of system 100 to transmit and/or receive signals, for example, in order to facilitate wired and/or wireless communications between one or more devices of system 100. Such components may be integrated with a corresponding element of system 100, for example. In some embodiments, the same or similar components may be used to perform one or more sensor measurements, as described herein.

For example, the same or similar components may be used to create an acoustic pulse (e.g., a transmission control signal and/or a digital shaping control signal), convert the acoustic pulse to an excitation signal (e.g., a shaped or unshaped transmission signal) and transmit it to a sonar transducer element to produce an acoustic beam, receive an acoustic return (e.g., a sound wave received by the sonar transducer element and/or corresponding electrical signals from the sonar transducer element), convert the acoustic return to acoustic return data, and/or store sensor information, configuration data, and/or other data corresponding to operation of a sonar system, as described herein.

Sensor signals, control signals, and other signals may be communicated among elements of system 100 using a variety of wired and/or wireless communication techniques, including voltage signaling, Ethernet, WiFi, Bluetooth, Zigbee, Xbee, Micronet, or other medium and/or short range wired and/or wireless networking protocols and/or implementations, for example. In such embodiments, each element of system 100 may include one or more modules supporting wired, wireless, and/or a combination of wired and wireless communication techniques.

In some embodiments, various elements or portions of elements of system 100 may be integrated with each other, for example, or may be integrated onto a single printed circuit board (PCB) to reduce system complexity, manufacturing costs, power requirements, and/or timing errors between the various sensor measurements. For example, gyroscope/accelerometer 144, user interface 120, and controller 130 may be configured to share one or more components, such as a memory, a logic device, a communications module, and/or other components, and such sharing may act to reduce and/or substantially eliminate such timing errors while reducing overall system complexity and/or cost.

Each element of system 100 may include one or more batteries or other electrical power storage devices, for example, and may include one or more solar cells or other electrical power generating devices (e.g., a wind or water-powered turbine, or a generator producing electrical power from motion of one or more elements of system 100). In some embodiments, one or more of the devices may be powered by a power source for mobile structure 101, using one or more power leads. Such power leads may also be used to support one or more communication techniques or protocols between elements of system 100.

In various embodiments, a logic device of system 100 (e.g., of orientation sensor 140 and/or other elements of system 100) may be adapted to determine parameters (e.g., using signals from various devices of system 100) for transforming a coordinate frame of sonar system 110 and/or other sensors of system 100 to/from a coordinate frame of mobile structure 101, at-rest and/or in-motion, and/or other coordinate frames, as described herein. One or more logic devices of system 100 may be adapted to use such parameters to transform a coordinate frame of sonar system 110 and/or other sensors of system 100 to/from a coordinate frame of orientation sensor 140 and/or mobile structure 101, for example. Furthermore, such parameters may be used to determine and/or calculate one or more adjustments to an orientation of a sensor of system 100 that would be necessary to physically align a coordinate frame of the sensor with a coordinate frame of orientation sensor 140 and/or mobile structure 101, for example, or an absolute coordinate frame. Adjustments determined from such parameters may be used to selectively power adjustment servos/actuators (e.g., of sonar system 110, ranging sensor 148, and/or other sensors or elements of system 100), for example, or may be communicated to a user through user interface 120, as described herein.

Figure 1B:
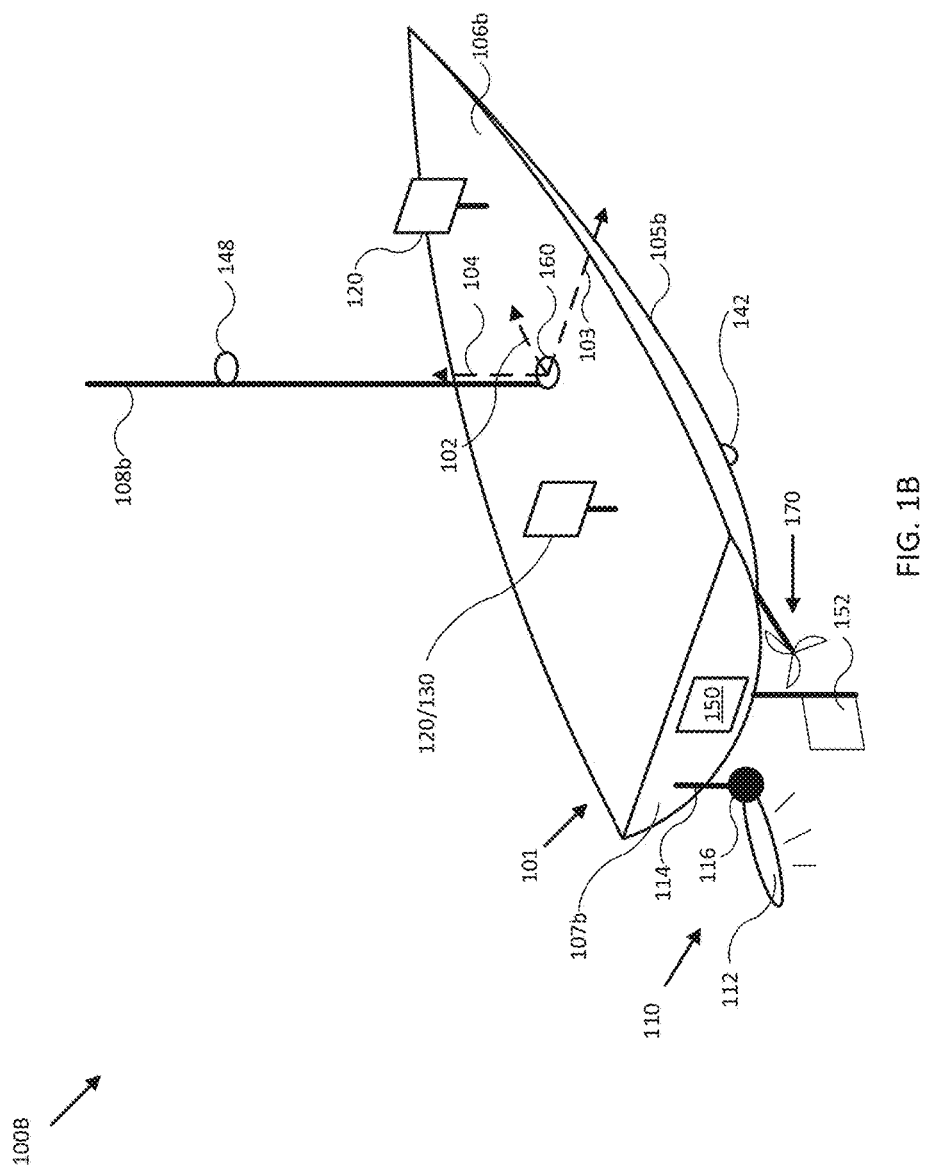
FIG. 1B illustrates a diagram of a collision avoidance system in accordance with an embodiment of the disclosure.

FIG. 1B illustrates a diagram of system 100B in accordance with an embodiment of the disclosure. As shown in FIG. 1B, system 100B may be implemented to provide collision avoidance data and/or imagery for use with operation of mobile structure 101, similar to system 100 of FIG. 1A. For example, system 100B may include sonar system 110, integrated user interface/controller 120/130, secondary user interface 120, steering sensor/actuator 150, sensor cluster 160 (e.g., orientation sensor 140, gyroscope/accelerometer 144, and/or GPS 146), ranging sensor 148, and various other sensors and/or actuators. In the embodiment illustrated by FIG. 1B, mobile structure 101 is implemented as a motorized boat including a hull 105b, a deck 106b, a transom 107b, a mast/sensor mount 108b, a rudder 152, an inboard motor 170, and an actuated sonar system 110 coupled to transom 107b. In other embodiments, hull 105b, deck 106b, mast/sensor mount 108b, rudder 152, inboard motor 170, and various actuated devices may correspond to attributes of a passenger aircraft or other type of vehicle, robot, or drone, for example, such as an undercarriage, a passenger compartment, an engine/engine compartment, a trunk, a roof, a steering mechanism, a headlight, a radar or LIDAR system, and/or other portions of a vehicle.

As depicted in FIG. 1B, mobile structure 101 includes actuated sonar system 110, which in turn includes transducer assembly 112 coupled to transom 107b of mobile structure 101 through assembly bracket/actuator 116 and transom bracket/electrical conduit 114. In some embodiments, assembly bracket/actuator 116 may be implemented as a roll, pitch, and/or yaw actuator, for example, and may be adapted to adjust an orientation of transducer assembly 112 according to control signals and/or an orientation (e.g., roll, pitch, and/or yaw) or position of mobile structure 101 provided by user interface/controller 120/130. For example, user interface/controller 120/130 may be adapted to receive an orientation of transducer assembly 112 configured to ensonify a portion of surrounding water and/or a direction referenced to an absolute coordinate frame, and to adjust an orientation of transducer assembly 112 to retain ensonification of the position and/or direction in response to motion of mobile structure 101, using one or more orientations and/or positions of mobile structure 101 and/or other sensor information derived by executing various methods described herein. In some embodiments, user interface/controller 120/130 may be configured to sweep transducer assembly 112 to ensonify a range of relative and/or absolute orientations.

In other embodiments, a similar bracket/actuator may be used to provide similar control and/or adjustment of an orientation of ranging sensor 148. Transducer assembly 112, ranging sensor 148, and/or other elements of system 100B may be implemented with a position and/or orientation sensor, which may include one or more sensors corresponding to orientation sensor 140, gyroscope/accelerometer 144 and/or GPS 146, for example, that is configured to provide absolute and/or relative positions and/or orientations and facilitate actuated orientation of the element or elements of system 100B.

In one embodiment, user interfaces 120 may be mounted to mobile structure 101 substantially on deck 106b and/or mast/sensor mount 108b. Such mounts may be fixed, for example, or may include gimbals and other leveling mechanisms/actuators so that a display of user interfaces 120 can stay substantially level with respect to a horizon and/or a "down" vector (e.g., to mimic typical user head motion/ orientation), for example, or so the display can be oriented according to a user's desired view. In another embodiment, at least one of user interfaces 120 may be located in proximity to mobile structure 101 and be mobile/portable throughout a user level (e.g., deck 106b) of mobile structure 101 and proximate areas surrounding mobile structure 101. For example, a secondary user interface 120 may be implemented with a lanyard, strap, headband, and/or other type of user attachment device and be physically coupled to a user of mobile structure 101 so as to be in proximity to the user and mobile structure 101. In various embodiments, user interfaces 120 may be implemented with a relatively thin display that is integrated into a PCB of the corresponding user interface in order to reduce size, weight, housing complexity, and/or manufacturing costs.

As shown in FIG. 1B, in some embodiments, speed sensor 142 may be mounted to a portion of mobile structure 101, such as to hull 105b, and be adapted to measure a relative water speed. In some embodiments, speed sensor 142 may be adapted to provide a thin profile to reduce and/or avoid water drag. In various embodiments, speed sensor 142 may be mounted to a portion of mobile structure 101 that is substantially outside easy operational accessibility. Speed sensor 142 may include one or more batteries and/or other electrical power storage devices, for example, and may include one or more water-powered turbines to generate electrical power. In other embodiments, speed sensor 142 may be powered by a power source for mobile structure 101, for example, using one or more power leads penetrating hull 105b. In alternative embodiments, speed sensor 142 may be implemented as a wind velocity sensor, for example, and may be mounted to mast/sensor mount 108b to have relatively clear access to local wind.

In some embodiments, ranging sensor 148 may be mounted to a portion of mobile structure 101, such as to hull 105b, deck 106b, mast/sensor mount 108b, and/or other portions of mobile structure 101 where ranging sensor 148 is able to transmit and/or receive AIS signals, radar signals, lidar signals, visible spectrum and/or infrared spectrum light, and/or other ranging signals over relatively short through relatively long distances (e.g., relative to a size and/or speed of mobile structure 101), such as less than one or two lengths of mobile structure 101 through many hundreds of lengths of mobile structure 101 and/or many minutes of travel time for mobile structure 101. In various embodiments, ranging sensor 148 may be mounted to mobile structure 101 and be configured to detect mobile targets and/or positions, courses, and/or other attributes of the mobile targets, as described herein. Ranging sensor 148 may be configured to detect mobile targets through various environmental conditions related to weather, climate, ambient light levels, and/or other conditions that typically influence an ability to send and/or receive particular types of ranging signals.

In the embodiment illustrated by FIG. 1B, mobile structure 101 includes direction/longitudinal axis 102, direction/lateral axis 103, and direction/vertical axis 104 meeting approximately at mast/sensor mount 108b (e.g., near a center of gravity of mobile structure 101). In one embodiment, the various axes may define a coordinate frame of mobile structure 101 and/or sensor cluster 160.

Each sensor adapted to measure a direction (e.g., velocities, accelerations, headings, or other states including a directional component) may be implemented with a mount, actuators, and/or servos that can be used to align a coordinate frame of the sensor with a coordinate frame of any element of system 100B and/or mobile structure 101. Each element of system 100B may be located at positions different from those depicted in FIG. 1B. Each device of system 100B may include one or more batteries or other electrical power storage devices, for example, and may include one or more solar cells or other electrical power generating devices. In some embodiments, one or more of the devices may be powered by a power source for mobile structure 101. As noted herein, each element of system 100B may be implemented with an antenna, a logic device, and/or other analog and/or digital components enabling that element to provide, receive, and process sensor signals and/or interface or communicate with one or more devices of system 100B. Further, a logic device of that element may be adapted to perform any of the methods described herein.

Under various circumstances, it may be important for mobile structure 101 to avoid being in close proximity to a mobile target. For example, a user may wish to avoid risk of a collision in open water due to the potentially devastating effects. Any damage caused by a collision may immobilize mobile structure 101 and/or the mobile target, possibly risking the life of any individuals on board mobile structure 101 and/or the mobile target.

In some instances, it may be challenging for a user of mobile structure 101 to evaluate the speed and/or the direction of a mobile target in relation to mobile structure 101. For example, the mobile target may be a large ship located far enough away from mobile structure 101 that visible inspection cannot provide a reliable estimate of the ships speed and/or relative orientation. In such instances, it can be difficult or impossible for a user to evaluate a course of the mobile target or whether mobile structure 101 should be piloted to cross the course ahead of the mobile target or behind the mobile target.

In some embodiments, a user may consider piloting/steering mobile structure 101 ahead of or behind the mobile target. In particular, it may be beneficial and/or required by local licensing or ordinances to maintain an area of space or safety margin surrounding mobile structure 101 and/or the mobile target as mobile structure 101 crosses ahead or behind the mobile target, and such safety margin may change depending on the size and/or type of mobile structure 101 and/or the mobile target. In various circumstances, such areas of space may ensure the safe and legal passing of mobile structure 101 and/or the mobile target when their headings cross. Thus, navigational image data, such as GPS data, sonar data, radar data, chart data, safety margin data, and/or other types of image data may be determined and/or displayed according to the positions of mobile targets relative to mobile structure 101 and/or the areas of space that must be maintained around such mobile targets.

In some embodiments, multiple navigational options may be provided to a user to avoid collisions with mobile targets and/or to maneuver mobile structure 101 around the mobile targets yet retain a desired waypoint destination and/or arrival time, for example, or a desired heading or range of speeds. For instance, a first option may be provided to pilot mobile structure 101 according to a first course ahead of a mobile target with a given speed, such that the first course maintains a minimum area of space between mobile structure 101 and the bow of the mobile target. A second option may be to pilot mobile structure 101 behind the mobile target to maintain the area of space between mobile structure 101 and the stern of the mobile target. Such options may be provided along with a recommended course (e.g., one of the first or second courses), an indication/hazard map to avoid certain areas (e.g., shallows, shipping lanes, low bridges or drawbridge sweeps), a track, a route, a heading, a waypoint, a bearing to the waypoint, a tracking angle, among other mechanisms and/or indicators to provide such options. In some embodiments, similar options may be used to navigate by land and/or by air.

In one embodiment, various options to avoid collisions may be provided using an Automatic Radar Plotting Aid (ARPA) system and/or a Potential Points of Collision (PPC) system. For example, course options may be determined and/or provided to avoid one or more PPC points in proximity to mobile structure 101 should mobile structure 101 steer in certain directions at one or more speeds. In various embodiments, determination of course options may utilize AIS and/or ACARS data, for example, to increase accuracy with respect to characteristics of the mobile target. For example, the navigational options may take into account the size and/or orientation of the mobile target, one or more areas of space to be maintained around the mobile target, the speed and/or changes to the speed of the mobile target, and/or other characteristics that can be determined from ranging sensor data, such as AIS data provided by an AIS receiver.

The various course options may be provided to a user via one or more displays of a collision avoidance system. For example, the system may provide intuitive guidance to a user by graphically displaying the options to the user on a map or chart that may be scaled, zoomed, and/or positioned to focus the user's attention on the potential collision and/or the course options. As such, the user may make a decision to pilot ahead, behind, or alongside the mobile target, and/or to implement other ways to move around and/or avoid colliding with the mobile target, such as changing a speed of mobile structure 101.

In some embodiments, the mobile target may be presented as a static object in the one or more displays, despite the mobile target moving relative to mobile structure 101, to emphasize the need to avoid the mobile target and select a provided course option to maneuver around/avoid the mobile target. In various embodiments, the collision avoidance system may be configured to provide a collision risk with each of the course options and/or a collision risk with each of one or more detected mobile targets. Such collision risks may help the user rate or choose a course option to avoid colliding with mobile targets.

When a mobile target is detected, one or more displays of the collision avoidance system may be configured to display a graphical representation of the mobile target, a projected course (e.g., based on a detected/determined current heading and/or speed) of the mobile target, and/or one or more predicted collision points (e.g., where mobile structure 101 and the mobile target are predicted to collide with each other). In addition, an estimated risk of collision may be shown proximate to a predicted collision point. For example, such estimated risk may account for nearest approach, current sea conditions, expected wake interaction with navigation, relative and/or absolute speeds, and/or other determined and/or detected characteristics of mobile structure 101, the mobile target, and/or various environmental conditions. In some embodiments, the collision avoidance system may receive information corresponding to the mobile target through an AIS, a radar system, a lidar system, and/or other types of ranging sensors/systems, including multi-sensor ranging systems such as visual spectrum and/or infrared bearing and laser range-finding multi-sensor systems, for example.

Typically, one or more positions of a mobile target may be determined from ranging data provided by one or more ranging systems. For example, in embodiments where ranging sensor 148 is implemented with a radar system or lidar system, a collision avoidance system may receive one or more relative positions of the mobile target (e.g., relative to mobile structure 101) and/or a cross section of the mobile target from ranging sensor 148. In some instances, the relative positions of the mobile target may be incorporated into image data generated by the collision avoidance system.

The examples and/or explanations provided herein describe mobile structures and/or mobile targets related to marine navigation, but the methodologies may be equally applicable to land and/or air-based applications, including navigation of land-based vehicles such as trucks, tanks, armored vehicles, and/or other vehicles configured to navigate terrain and/or land, and/or navigation of aircraft such as airplanes, jets, helicopters, and/or other aircraft configured to navigate through airspaces.

Figure 2A:
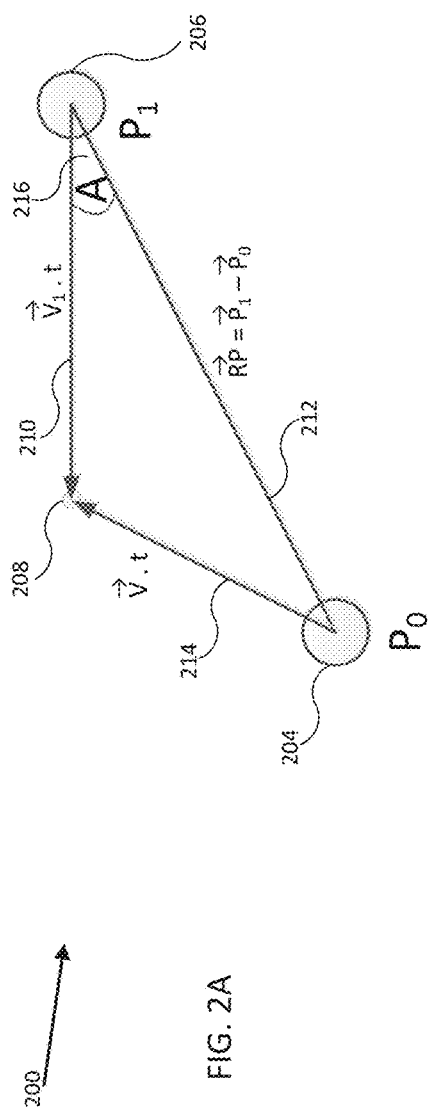
FIG. 2A illustrates image data generated by a collision avoidance system in accordance with an embodiment of the disclosure.

FIG. 2A illustrates navigational and/or image data 200 generated by a collision avoidance system (e.g., system 100 of FIG. 1A and/or system 100B of FIG. 1B) in accordance with an embodiment of the disclosure. As shown, image data 200 depicts a mobile target 206 and a mobile structure 204, where mobile structure 204 is represented as "$P_0$" and mobile target 206 is represented as "$P_1$". Mobile structure 204 may be a distance away from mobile target 206, illustrated by line segment 212, and the collision detection system may be configured to detect one or more relative positions of mobile target 206 relative to mobile structure 204. FIG. 2A and the description that follows are presented with respect to two dimensions for simplicity, but it should be understood that the described principles may also be applied to three dimensional navigation scenarios, such as those presented with respect to FIG. 6, for example.

Mobile structure 204 may, for example, take the form of mobile structure 101 described above in relation to FIG. 1A-B. For example, a collision avoidance system of mobile structure 204 may receive one or more relative positions of mobile target 206 and/or a cross section of mobile target 206 from a radar system. In some instances, relative and/or absolute positions may be received from GPS 146 and/or ranging sensor 148, among other devices configured to determine the relative and/or absolute positions of mobile target 206 and/or mobile structure 204. For example, the following equation may be used to determine the relative positions:

$$\vec{RP} = \vec{P_1} - \vec{P_0} \qquad \text{(Equation 2.1)}$$

where $\vec{RP}$ is a vector describing the position of mobile target 206 relative to mobile structure 204, illustrated in FIG. 2A as line segment 212. As shown in FIG. 2A, line segment 212 is designated as "$RP = P_1 - P_0$".

In some embodiments, a vector may be associated with one or more directions, and the one or more directions may be represented in image data by line segments and/or arrows indicating the one or more directions. For example, $\vec{P_0}$ may indicate position $P_0$ of mobile structure 204 relative to an arbitrary reference frame that is not shown in the FIGS. Similarly, $\vec{P_1}$ may indicate position $P_1$ of mobile target 206. In some instances, point 208 may be a predicted collision point between mobile structure 204 at $P_0$ and mobile target 206 at $P_1$. For example, point 208 may be a predicted collision point along projected course 210 of mobile target 206. Predicted collision point 208 may be represented by longitude and/or latitude coordinates, other GPS coordinates, relative position coordinates (e.g., relative heading and distance), and/or other coordinates identifiable on a geographic map. One or more avoidance courses (e.g., versions of course 214 with different directions) may be shown with one or more degrees of freedom, for example to further illustrate mobile structure 204 at $P_0$ avoiding collision with mobile target 206 at $P_1$, as described further herein.

In various embodiments, $\overrightarrow{RP}$ may also be related to the velocities of mobile structure 204 and mobile target 206 according to the following equation:

$$\overrightarrow{RP} = \overrightarrow{V} \cdot t - \overrightarrow{V_1} \cdot t \qquad \text{(Equation 2.2)}$$

where $\overrightarrow{V_1}$ is a velocity vector for mobile target 206 at $P_1$, including a relative or absolute direction and/or a magnitude, t is time, and $\overrightarrow{V}$ is a velocity vector of mobile structure 204 at $P_0$, including a relative or absolute direction and/or a magnitude, where the magnitude of a vector $\overrightarrow{V}$ may be denoted $|V|$. For example, in some embodiments, $\overrightarrow{V_1}$ may represent course over ground (COG) and/or speed over ground (SOG). $\overrightarrow{V_1}$ may broadcasted by an AIS and/or determined by GPS 146 and/or ranging sensor 148, for example, among other devices configured to detect/determine one or more positions and/or velocities of mobile target 206. As shown, projected course 210 is designated with "$\overrightarrow{V_1} \cdot t$" and predicted course 214 is designated with "$\overrightarrow{V} \cdot t$", where courses 210 and 214 correspond to the portions of the respective courses up to the point of potential collision at point 208. In some instances, a collision avoidance system may determine a velocity and/or an estimated size of mobile target 206 based, at least in part, on received relative positions and/or a cross section of the mobile target 206 provided by ranging sensor 148. Further, the system may determine projected course 210 based on the velocity and/or the estimated size of mobile target 206. From equations 2.1 and 2.2, and as can be seen in FIG. 2A, predicted collision point 208 is one solution for the magnitude of the velocity of mobile structure 101 where the two objects collide.

As shown in FIG. 2A, angle 216 may be determined from projected course 210 and the direction of RP, and angle 216 may be illustrated between projected course 210 and line segment 212. Various calculations may be applied to determine angle 216 such as the law of cosines, cosine formulas, cosine rules, and/or other calculations and/or formulas to determine angle 216. In the following equation, angle 216 may be represented as angle "A":

$$|V^2| \cdot t^2 = \overrightarrow{RP}^2 + |V_1^2| \cdot t^2 - 2 \cdot |\overrightarrow{RP}| \cdot |V_1| \cdot t \cdot \cos A \qquad \text{(Equation 2.3)}$$

In some embodiments, additional calculations may be implemented. For example, the equation above may be rearranged to equal zero:

$$|V_1^2| \cdot t^2 - |V^2| \cdot t^2 - 2 \cdot |\overrightarrow{RP}| \cdot |V_1| \cdot t \cdot \cos A + \overrightarrow{RP}^2 = 0 \qquad \text{(Equation 2.4)}$$

In some embodiments, additional calculations may be applied to determine an equation (e.g., quadratic equations, algebraic formulas, and/or functions) to solve for t. In particular, the following equation may be used to solve for t:

$$t = \frac{-b \pm \sqrt{b^2 - 4ac}}{2a} \qquad \text{(Equation 2.5)}$$

Solving for t using equations 2.5 and 2.4 yields:

$$t = \frac{2 \cdot |\overrightarrow{RP}| \cdot |V_1| \cdot \cos A \pm \sqrt{\left(2 \cdot |\overrightarrow{RP}| \cdot |V_1| \cdot \cos A\right)^2 - 4(|V_1^2| - |V^2|) \cdot \overrightarrow{RP}^2}}{2(|V_1^2| - |V^2|)} \qquad \text{(Equation 2.6)}$$

In some embodiments, $|\overrightarrow{RP}| \cdot |V_1| \cdot \cos A$ may be, for example, a vector dot product, $\overrightarrow{RP} \cdot V_1$. Further, a negative sign may be added to the vector dot product depending on the size and orientation of angle A. For example, the following equation may be determined for t:

$$t = \frac{-\overrightarrow{RP} \cdot \overrightarrow{V_1} \pm \sqrt{\left(\overrightarrow{RP} \cdot \overrightarrow{V_1}\right)^2 - (|V_1^2| - |V^2|) \cdot \overrightarrow{RP}^2}}{|V_1^2| - |V^2|} \qquad \text{(Equation 2.7)}$$

In some embodiments, various equations, such as those presented above, may determine one or more predicted collision points 208. For example, the system may determine one or more predicted collisions points along projected course 210 of mobile target 206 based on the equation above. In some instances, the "+/−" designation in the equation above may result in multiple solutions. Further, the multiple solutions may correspond to one or more predicted collision points between mobile structure 204 at $P_0$ and mobile target 206 at $P_1$.

Figure 2B:
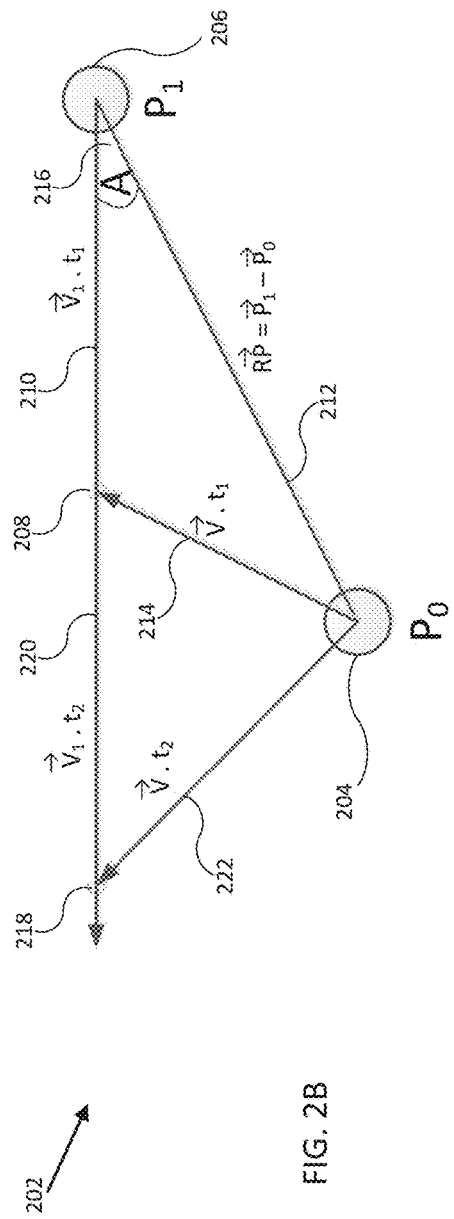
FIG. 2B illustrates updated image data generated by a collision avoidance system in accordance with an embodiment of the disclosure.

FIG. 2B illustrates updated image data 202 generated by a collision avoidance system in accordance with an embodiment of the disclosure. As shown, image data 202 may include aspects of image data 200 described above in relation to FIG. 2A. For example, image data 202 may include mobile structure 204 designated as at position $P_0$, mobile target 206 designated as at position $P_1$, predicted collision point 208, and/or courses/line segments 210-214 described above in relation to FIG. 2A. Further, image data 202 may include predicted collision point 218 similar to point 208 described above. As shown, point 218 may be a second predicted collision point between mobile target 206 and mobile structure 204, where the magnitude of the velocity of mobile structure 204 is the same, but the direction of the velocity is different. For example, point 218 may be a predicted collision point along projected course 220 of mobile target 206 and/or along predicted course 222 of mobile structure 204. In some instances, projected courses 210 and 220 of mobile target 206 may be a single projected course of mobile target 206. As shown in FIG. 2B, projected course 220 is designated as "$V_1 \cdot t_2$" and predicted course 222 as "$V \cdot t_2$", where "$t_2$" indicates a solution for t different from t in FIG. 2A.

In some embodiments, and as shown in FIG. 2B, various predicted collision points (e.g., points 208 and 218) may be determined between mobile structure 204 at $P_0$ and mobile target 206 at $P_1$. In some instances, points 208 and/or 218 may correspond to predicted collision points where mobile structure 204 is predicted to collide with mobile target 206. For example, points 208 and/or 218 may correspond to predicted points of head-to-head collisions, side-to-side collisions, a bow section of mobile structure 204 colliding into a stern section of mobile target 206 or vice versa, and/or other types of collisions between mobile targets and/or mobile structures.

In some embodiments, locations of points 208 and 218 may be determined by the following equation:

$$\vec{RP} + \vec{V_1} \cdot t \qquad \text{(Equation 2.8)}$$

where $\vec{RP}$ is the relative position of mobile target 206 with respect to mobile structure 204, $\vec{V_1}$ is a velocity vector of mobile target 206, and/or t is time, as described above in relation to FIG. 2A. Further, in some embodiments, t may be a negative value indicating that the time of a corresponding predicted collision may have passed. In such instances, the possibility and/or risk of a collision may be eliminated and/or reduced. Further, in some instances, one or more of points 208 and/or 218 may be historical predicted collision points that are no longer associated with future predicted collisions, possibly after mobile target 206 changes its projected course 220 (e.g., it's velocity), for example, away from $P_0$.

In some embodiments, predicted collision points may change from one location to another location. In some instances, one predicted collision point may be separated into two or more predicted collision points. Further, two or more collision points may be combined into a single predicted collision point, among other possibilities. In some instances, one or more collision points may be determined by the following equation:

$$\sqrt{\left(\vec{RP} \cdot \vec{V_1}\right)^2 - (|V_1^2| - |V^2|) \cdot \vec{RP}^2} = 0 \qquad \text{(Equation 2.9)}$$

In some embodiments, one or more predicted collision points may be determined when $\vec{RP}$ is equal to zero, thereby indicating the approximate moment of a collision between mobile structure 204 and mobile target 206 (e.g., where the relative position is zero). Yet further, in some instances, mobile structure 204 and mobile target 206 may travel with the same velocities and/or approximately similar velocities. For example, the same and/or approximately the same velocities may be represented by the following equation:

$$|V_1^2| - |V^2| = 0 \qquad \text{(Equation 2.10)}$$

In some embodiments, possibly when mobile structure 204 and mobile target 206 may travel with the same velocities and/or approximately similar velocities, one or more of equations 2.1-2.10 may be indefinite. For example, equations 2.6 and 2.7 may have a zero in their respective denominators, possibly causing the equations to be indefinite. In such instances, the collision avoidance system may be configured to detect the potential indefiniteness and to determine the predicted collision points using other equations and/or formulas. For example, the following equation may be used:

$$|V_1| \cdot t \cdot \cos A = |\vec{RP}|/2 \qquad \text{(Equation 2.11)}$$

In some embodiments, the predicted collision points may be static points. For example, mobile structure 204 may traverse towards points 208 and/or 218, where points 208 and/or 218 may be stationary points. In some instances, mobile structure 204 may traverse away from points 208 and/or 218 such that points 208 and/or 218 may disappear, such as when there is no longer a possibility of collision. In other embodiments, the predicted collision points may be updated as additional positions and/or velocities of mobile structure 204 and/or mobile target 206 are updated. For example, points 208 and/or 218 may be updated based on updates to projected courses 210 and/or 220 of mobile target 206. Further, points 208 and/or 218 may be updated based on updated velocities of mobile target 206. Points 208 and/or 218 may also be updated based on updates to predicted courses 214 and/or 222 and/or updated velocities of mobile structure 204.

In some embodiments, a collision avoidance system may be configured to determine various dimensions of one or more mobile targets and use such dimensions to determine avoidance areas and/or courses, as described herein. For example, the length of mobile target 206 may be received from an AIS receiver (e.g., ranging sensor 148). Further, the navigation state of mobile target 206 may be received from the AIS, which may indicate mobile target 206 will "give way" to mobile structure 204 or will "stand on" (e.g., continue on its projected courses 210 and/or 220). Further, one or more avoidance areas may be determined relative to points 208 and/or 218 based on the length of mobile target 206 along courses 210 and/or 220. In some instances, the avoidance areas may take various forms, profiles, contours, shapes, and/or characteristics defining the avoidance areas according to a size and/or shape of mobile target 206, mobile structure 204, and/or their courses. In some instances, the avoidance areas may be determined based on local regulations, maritime authority regulations, collision avoidance regulations, and/or general practices for reducing and/or eliminating the possibilities/risk of collisions. In various embodiments, a collision avoidance system may be configured to generate image data 200 of FIG. 2A and/or image data 202 of FIG. 2B to illustrate potential collisions, avoidance areas, avoidance courses, and/or other collision avoidance data to a user and/or to help pilot mobile structure 101.

Figure 3A:
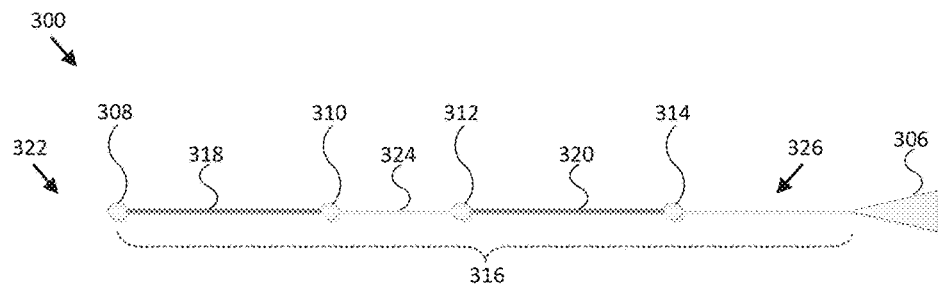
FIG. 3A illustrates image data generated by a collision avoidance system in accordance with an embodiment of the disclosure.

FIG. 3A illustrates image data 300 generated by a collision avoidance system in accordance with an embodiment of the disclosure. In some embodiments, image data 300 may be generated and/or rendered via a collision avoidance system (e.g., corresponding to systems 100 and/or 100B of FIGS. 1A and 1B). Further, image data 300 may illustrate one or more of a mobile target 306, a mobile structure 304, and one or more courses of the mobile target and/or the mobile structure. For example, mobile structure 304 may take the form of one or more mobile structures 101 and/or 204 in FIGS. 1A-2B. Further, mobile target 306 may take the form of mobile target 206 described above in relation to FIGS. 2A-B. Yet further, one or more points 308, 310, 312, and 314 may take the form of one or more points 208 and 218 described above in relation to FIGS. 2A-B. In addition, projected course 316 of mobile target 306 may take the form of projected courses 210 and/or 220 described above in relation to FIGS. 2A-B. As shown, mobile structure 304 includes a bow represented by a pointed portion headed along projected course 316 and a stern represented by a flat portion. Further, mobile target 306 includes a bow represented by a pointed portion headed toward projected course 316 and a stern represented by a flat portion.

In some embodiments, one or more predicted collision points may be determined for mobile target 306 and/or mobile structure 304. As shown, one or more points 308, 310, 312, and/or 314 may be predicted collision points for mobile target 306 and/or mobile structure 304. In some instances, one or more of predicted collision points 308-314 may be determined based on an estimated size of mobile target 306. For example, a collision avoidance system may determine an estimated size of mobile target 306 based on ranging return signals received from a radar system of ranging sensor 148. Yet further, ranging sensor 148 may include an AIS and/or ACARS receiver, for example, and the system may receive one or more dimensions of mobile target 306 from the AIS and/or AGARS receiver. In such instances, the system may determine one or more of predicted collision points 308-314 based on the one or more dimensions of mobile target 306. For example, points 308 and 310 and/or points 312 and 314 may be determined based on an estimated length of mobile target 306, such as an estimated length from the bow to the stern of mobile target 306. Further, points 308-310 may be determined based on local regulations, maritime authority regulations, collision avoidance regulations, and/or general practices indicating a minimum fore and aft distance for reducing and/or eliminating the possibilities of one or more collisions with mobile target 306. Such minimum fore and aft distances may be velocity/relative velocity dependent.

In some embodiments, one or more predicted collision points may be determined based on one or more velocities of mobile target 306 and/or mobile structure 304. For example, projected course 316 may include a velocity of mobile target 306, e.g., a velocity magnitude, a direction of mobile target 306, and/or a relative velocity of mobile target 306. Further, the system may determine one or more predicted collision points 308-314 between mobile target 306 and mobile structure 304 and along projected course 316 based, at least in part, on the velocity of mobile target 206. In some instances, points 308 and 310 and/or points 312 and 314 may be closer together and/or farther from each other based on the velocity of mobile target 306 and/or mobile structure 304.

In some embodiments, an avoidance area may be determined for mobile target 306 and/or mobile structure 304, such that the avoidance areas indicate an absolute and/or high likelihood of collision between mobile target 306 and mobile structure 304. An avoidance area may be an area identified and/or determined by a collision avoidance system. For example, an avoidance area may be associated with a predicted collision and/or a risk of a collision involving mobile target 306 and/or mobile structure 304. As such, mobile structure 304 may be piloted, e.g., steered, away from one or more avoidance areas. For example, mobile structure 304 may be piloted and/or steered to evade, dodge, and/or escape one or more avoidance areas, as provided by the collision avoidance system, among other ways to traverse around one or more of the avoidance areas. In various embodiments, a collision avoidance system may be configured to determine one or more avoidance areas, generate image data including the avoidance areas, and to render the image data for display to a user, where the user may use the image data to decide on a course of action, such as piloting mobile structure 101 to avoid the avoidance areas. In some embodiments, a collision avoidance system may provide the avoidance areas and/or image data corresponding to the avoidance areas to an autopilot configured to pilot mobile structure 101 to avoid the avoidance areas.

In various embodiments, an avoidance area may be determined by one or more points. For example, a collision avoidance system may determine one or more avoidance areas 318 and 320 based, at least in part, on points 308-314 that may include one or more predicted collision points. As shown, avoidance area 318 may be determined based on points 308 and 310, and avoidance area 320 may be determined based on points 312 and 314. For example, avoidance area 318 may be determined based on predicted collision points 308 and 310 along projected course 316 of mobile target 306, and avoidance area 320 may be determined based on predicted collision points 312 and 314 along projected course 316 of mobile target 306. Further, in some instances, a collision avoidance system may determine one or more avoidance areas 318 and/or 320 based, at least in part, on a determined velocity and/or an estimated size of mobile target 306. Yet further, avoidance areas 318 and/or 320 may be enlarged, shortened, otherwise modified and/or updated based on updated velocities and/or positions of mobile structure 304 and/or mobile target 306 and/or local regulations, maritime authority regulations, collision avoidance regulations, and/or general practices for reducing and/or eliminating the possibilities of one or more collisions with mobile target 306.

To explain further, in one embodiment, avoidance areas 318 and/or 320 may be determined by determining corresponding centroid predicted collision points (e.g., similar to predicted collision points 208 and 218 in FIG. 2B, which may correspond substantially to predicted collisions between centroids of mobile structure 204 and mobile target 206 and/or centroids of corresponding regulatory safety margins/zones about mobile structure 204 and/or mobile target 206, for example) and then extending the centroid predicted collision points about projected course 316 to avoidance areas 318 and 320, which may have dimensions substantially equal to a bow to stern length and/or other dimensions of mobile target 306 (e.g., such as a length of a corresponding regulatory safety zone about mobile target 206). In such embodiment, avoidance areas 318 and 320 may change position but generally stay the same size as time progresses (e.g., according to the equations provided herein).

In another embodiment, each predicted collision point 308-314 may correspond to a dimension of mobile target 306, and avoidance areas 318 and/or 320 may be determined by determining the position for each predicted collision point 308-314 separately based on a corresponding bow and/or stern position of mobile target 306 (e.g., and/or other positions and/or dimensions of mobile target 306, such as a length or width of a corresponding regulatory safety zone) from the equations provided herein. Such determination may be made relative to a centroid of mobile structure 304, for example, or from one or more other structural positions and/or dimensions of mobile structure 304, such as a bow or stern position and/or a bow to stern dimension. In embodiments where the determinations are made relative to structural dimensions (e.g., multiple structural positions) of mobile structure 304, collision points 308-314 may correspond to maximum extents of multiple sets of collision points determined along course 316. Once collision points 308-314 are determined, avoidance areas 318 and 320 may be determined based on the positions of collision points 308-314 grouped according to a corresponding predicted collision time and/or the dimensions of mobile target 306, as shown in FIG. 3A and described in the equations provided herein. In such embodiments, avoidance areas 318 and 320 may change position and/or size as time progresses (e.g., according to the equations provided herein).

Figure 3B:
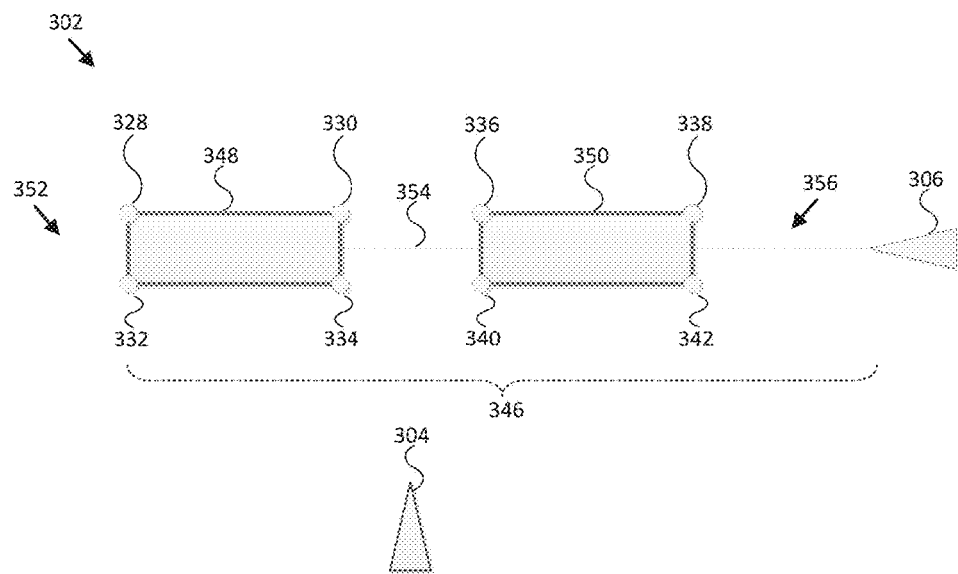
FIG. 3B illustrates updated image data generated by a collision avoidance system in accordance with an embodiment of the disclosure.
Figure 6:
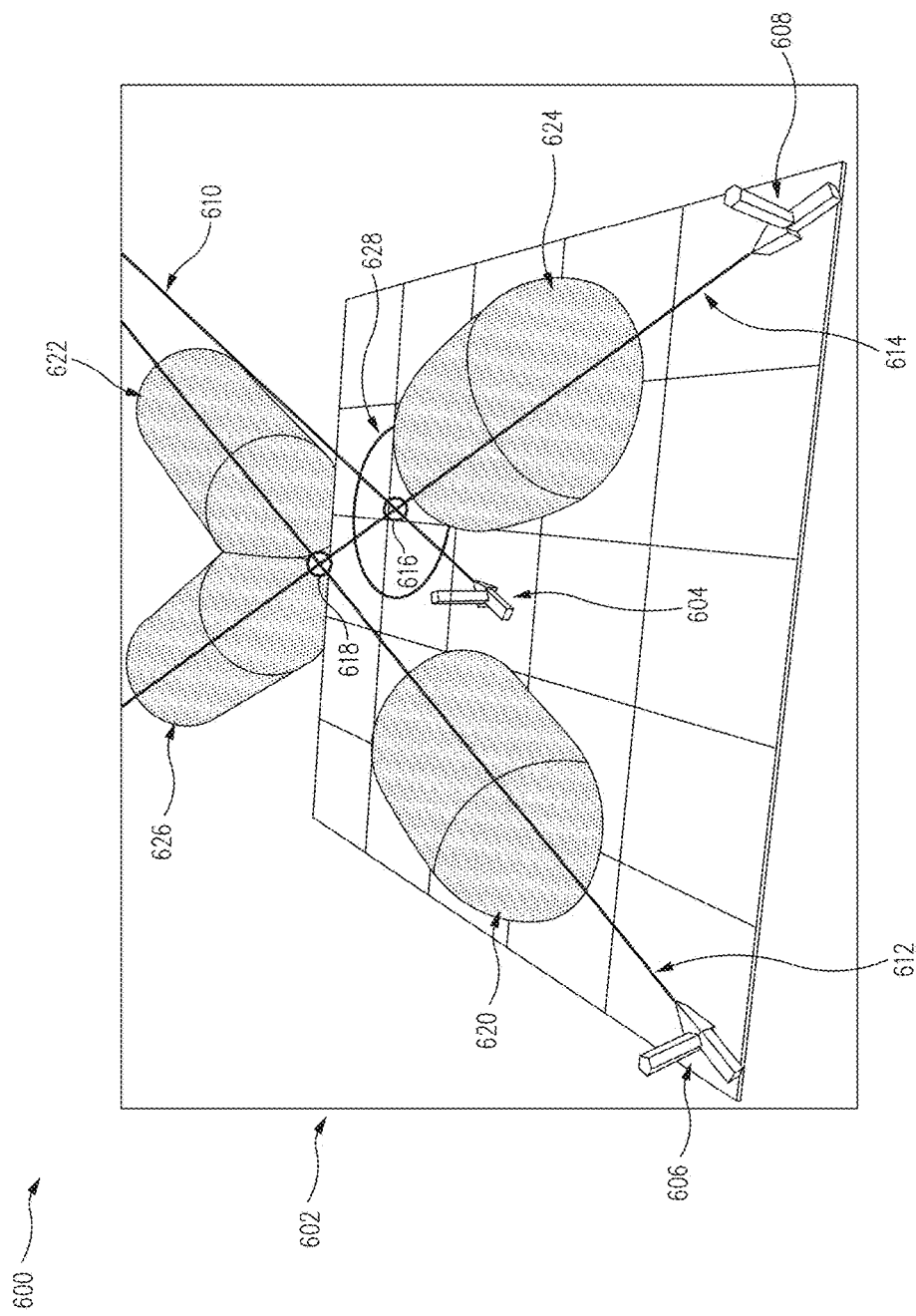
FIG. 6 illustrates image data generated by a collision avoidance system in accordance with an embodiment of the disclosure.

Similar methods or a combination of methods may be used to determine two dimensional and/or three dimensional avoidance areas (e.g., avoidance areas 348 and 350 of FIG. 3B, and/or avoidance areas 620-626 of FIG. 6). For example, in one embodiment, the length of avoidance areas 348 and/or 350 along course 346 may be determined by determining the longitudinal position of each point 328-342 separately, and the width of avoidance areas 348 and/or 350 may be determined as a known starboard to port width of mobile target 306 (e.g., and/or a corresponding regulatory safety zone).

In some embodiments, a collision avoidance system may be configured to determine one or more clearance zones corresponding to determined avoidance areas. In some instances, image data may be generated based on the determined clearance zones. Further, the clearance zones may be rendered on a display of user interface 120, possibly including a graphical indicator, e.g., a circular, rectangular, ovoid, and/or other shape, of the clearance zones. In some instances, the clearance zones may take various forms, profiles, contours, shapes, and/or characteristics defining the clearance zones in accordance with the shape and/or course of mobile target 306 and/or mobile structure 204. As shown in FIG. 3A, the one or more avoidance areas may include first avoidance area 318 and second avoidance area 320 along the projected course 316, where first avoidance area 318 may be further from detected mobile target 306 than second avoidance area 320. In some instances, a collision avoidance system may determine first clearance zone 322 along the projected course 316 that is further from detected mobile target 306 than first avoidance area 318. Such system may also determine second clearance zone 324 between first avoidance area 318 and second avoidance area 320, and determine third clearance zone 326 separate from first clearance zone 322 and/or second clearance zone 324 (e.g., at least all points along course 316 between mobile target 306 and second avoidance area 320). For example, third clearance zone 326 may be all points along course 316 not already allocated to first and second clearance zones 322 and 324 or avoidance areas 318 and 320, including all points along a portion of course 316 and/or along a reciprocal course extending behind mobile target 306. In addition, the system may determine one or more avoidance courses for the mobile structure based, at least in part, on first, second, and/or third clearance zones 322, 324, and/or 326, respectively.

In some embodiments, a collision avoidance system may be configured to determine an avoidance course for mobile structure 304. In some instances, an avoidance course may be determined for mobile structure 304 to traverse projected course 316 around one or more of avoidance areas 318 and/or 320. For example, an avoidance course may include and/or be directed towards one or more of clearance zone 322, 324, and/or 326. In particular, mobile structure 304 may traverse projected course 316 through first clearance zone 322, second clearance zone 324, or third clearance zone 326, and/or other clearance zones to avoid avoidance areas 318 and/or 320.

In some embodiments, a collision avoidance system may be configured to determine various risks associated with mobile structure 304 traversing projected course 316, including course 326. In some instances, such risks may include risks associated with mobile structure 304 traversing projected course 326 through first 322, second 324, and/or third 326 clearance zones. Further, these respective risks may be minimum risks for traversing projected course 326 through first 322, second 324, and/or third 326 clearance zones based on, for example, relative and/or absolute velocities (e.g., higher velocities/gradients being more risky), environmental conditions (e.g., where harsher conditions are more risky), and/or other risk factors associated with proximity between a mobile structure and a mobile target. For example, the system may use such criteria to determine a first risk associated with mobile structure 304 traversing projected course 326 through first clearance zone 322, a second risk associated with mobile structure 304 traversing projected course 326 through second clearance zone 324, and a third risk associated with mobile structure 304 traversing projected course 326 through third clearance zone 326, and to relate such risks to each other. In addition, system 100 may determine a recommended avoidance course of the one or more avoidance courses for mobile structure 304 based, at least in part, on the first, second, and/or third risks, such as selecting the recommended avoidance course as the course through a center or other portion of the clearance zone presenting the least risk.

In some embodiments, ranging sensor 148 of system 100 may include an AIS or similar type receiver. In such embodiments, one or more predicted collision points may include first and second collision points 308 and 312, one or more avoidance areas may include first and second avoidance areas 318 and 320, and system 100 may receive one or more dimensions of mobile target 306 from the AIS receiver. As such, the system may determine first and second avoidance areas 318 and 320 based, at least in part, on first and second collision points 308 and 312 and the one or more dimensions of mobile target 306. Further, the system may determine first and second avoidance areas 318 and 320 based, at least in part, on first and second collision points 310 and 314 and the one or more dimensions of mobile target 306. In addition, system 100 may determine clearance zone 324 between the first and second avoidance areas 318 and 320. Further, system 100 may generate image data based, at least in part, on the clearance zone 324, and in some embodiments render the image data on a display of system 100.

In embodiments where the system receives one or more dimensions of mobile target 306 from the AIS receiver, system 100 may be configured to determine one or more avoidance areas 318 and 320 based, at least in part, on the one or more dimensions of mobile target 306. System 100 may be configured to determine an avoidance course for mobile structure 304 to avoid one or more of avoidance areas 318 and 320. In addition, system 100 may generate image data based, at least in part, on the avoidance course. In addition, the system, e.g., system 100, may be configured to pilot mobile structure 304 via steering sensor/actuator 150 and/or propulsion system 170 with respect to the avoidance course.

FIG. 3B illustrates updated image data 302 generated by a collision avoidance system in accordance with an embodiment of the disclosure. In some embodiments, image data 302 may be rendered via a collision avoidance system (e.g., corresponding to system 100 of FIG. 1A). As shown, image data 302 may include aspects of image data 300 described above in relation to FIG. 3A. For example, image data 302 may include mobile structure 304 and/or mobile target 306. Further, one or more points 328, 330, 332, and/or 334 may take the form of one or more points 308 and/or 310. For example, point 308 may be located between points 328 and 330, and point 310 may be between points 330 and 334. Further, one or more points 336, 338, 340, and/or 342 may take the form of one or more points 312 and/or 314. For example, point 312 may be located between points 336 and 340, and point 314 may be between points 338 and 342. In addition, projected course 346 of mobile target 306 may take the form of projected course 316 described above in relation to FIG. 3A.

In some embodiments, one or more of points 328-334 and/or 336-342 may be determined based on one or more dimensions of mobile target 306. Further, one or more of points 328-334 and/or 336-342 may be determined in any manner described above in relation to FIGS. 1-3A. In some instances, one or more of points 328-334 and/or 336-342 may be predicted collision points for mobile target 306 and/or mobile structure 304. For example, the system may determine one or more of predicted collision points 328-334 and/or 336-342 328 based on one or more dimensions of mobile target 306. Further, points 328-334 and/or 336-342 may also be determined based on a length and/or a width of mobile target 306. For example, the length between points 330 or 334 to respective points 328 or 332, and/or between points 336 or 340 to respective points 338 or 342 may be determined based on a length of mobile target 306, such as from the bow to the stern of mobile target 306. Further, points 328-330 to points 332-334, points 336-338 to points 340-342 may be determined based on a width of mobile target 306 from the starboard to the port of mobile target 306 or vice versa.

In some embodiments, such avoidance areas may be determined based on one or more dimensions of mobile target 306 in any manner described above in relation to FIGS. 2A-3B. For example, such avoidance areas may be determined based on one or more of points 328-342. In some instances, a collision avoidance system may determine one or more of avoidance areas 348 and 350 based, at least in part, on points 328-342 that may include one or more predicted collision points. As shown, avoidance area 348 may be determined based on points 328-334, and avoidance area 350 may be determined based on points 336-342. For example, avoidance area 348 may be determined based on predicted collision points 328-334 along projected course 346 of mobile target 306. Further, avoidance area 350 may be determined based on predicted collision points 336-342 along projected course 346 of mobile target 306. In various embodiments, each collision point 328-342 may be individually determined using the methods described herein with respect to FIGS. 2A-2B. For example, in some instances, the system may determine one or more avoidance areas 348 and/or 350 based, at least in part, on a determined velocity and/or an estimated size of mobile target 306 and/or mobile structure 304.

In some embodiments, one or more clearance zones may be determined by avoidance areas 348 and/or 350. For example, the one or more clearance zones may be determined in any manner described above in relation to FIGS. 2A-3B. In some embodiments, avoidance area 348 may be a first avoidance area further from detected mobile target 306 than avoidance area 350, e.g., a second avoidance area. In some instances, the system may determine first clearance zone 352 along the projected course 346 that is further from detected mobile target 306 than first avoidance area 348. For example, first clearance zone 352 may be determined by points 328 and/or 332. In some instances, the system may determine second clearance zone 354 between first avoidance area 348 and second avoidance area 350. Further, second clearance zone 354 may be determined by points 330, 334, 336, and/or 340. In some instances, the system may determine third clearance zone 356 separate from first clearance zone 352 and/or second clearance zone 354, along projected course 354. For example, third clearance zone 356 may be between second avoidance area 350 and mobile target 306. Further, third clearance zone 356 may be determined by points 338, 342, and/or the dimensions of mobile 306. In addition, the system may determine one or more avoidance courses for the mobile structure based, at least in part, on first, second, and/or third clearance zones 352, 354, and/or 356, respectively.

In some embodiments, one or more avoidance courses may be determined for mobile structure 304 to traverse course 346 to avoid avoidance areas 348 and 350. In some instances, the one or more avoidance courses may be determined in any manner described above in relation to FIGS. 2A-3B. Further, an avoidance course may include one or more of clearance zones 352, 354, and/or 356. For example, mobile structure 304 may traverse projected course 346 through first clearance zone 352. Further, mobile structure 304 may traverse projected course 346 through second clearance zone 354. Yet further, mobile structure 304 may traverse projected course 346 through third clearance zone 356, and/or another clearance zone to maneuver around avoidance areas 348 and/or 350.

In some embodiments, various risks may be determined for mobile structure 304 in traversing projected course 356. In some instances, the one or more risks may be determined as described above in FIG. 3A. For example, the system may determine a first risk associated with mobile structure 304 traversing projected course 346 through first clearance zone 352, a second risk associated with mobile structure 304 traversing projected course 346 through second clearance zone 354, and a third risk associated with mobile structure 304 traversing projected course 346 through third clearance zone 356. In addition, system 100 may determine a recommended avoidance course of the one or more avoidance courses for mobile structure 304 based, at least in part, on the first, second, and/or third risks.

In some embodiments, a collision avoidance system may include a memory configured to store one or more dimensions of mobile structure 304. Further, the system may receive the one or more dimensions of mobile structure 304 from the memory. Further the system may determine an avoidance course for mobile structure 304 to avoid one or more of avoidance areas 348 and/or 350, where the avoidance course is based, at least in part, on the one or more dimensions of mobile structure 304. In addition, the system may generate image data 302 based, at least in part, on the avoidance course, wherein generated image data 302 includes the avoidance course for mobile structure 304. In various embodiments, a collision avoidance system may be configured to generate image data 300 of FIG. 3A and/or image data 302 of FIG. 3B to illustrate potential collisions, avoidance areas, avoidance courses, and/or other collision avoidance data to a user and/or to help pilot mobile structure 101.

Figure 4:
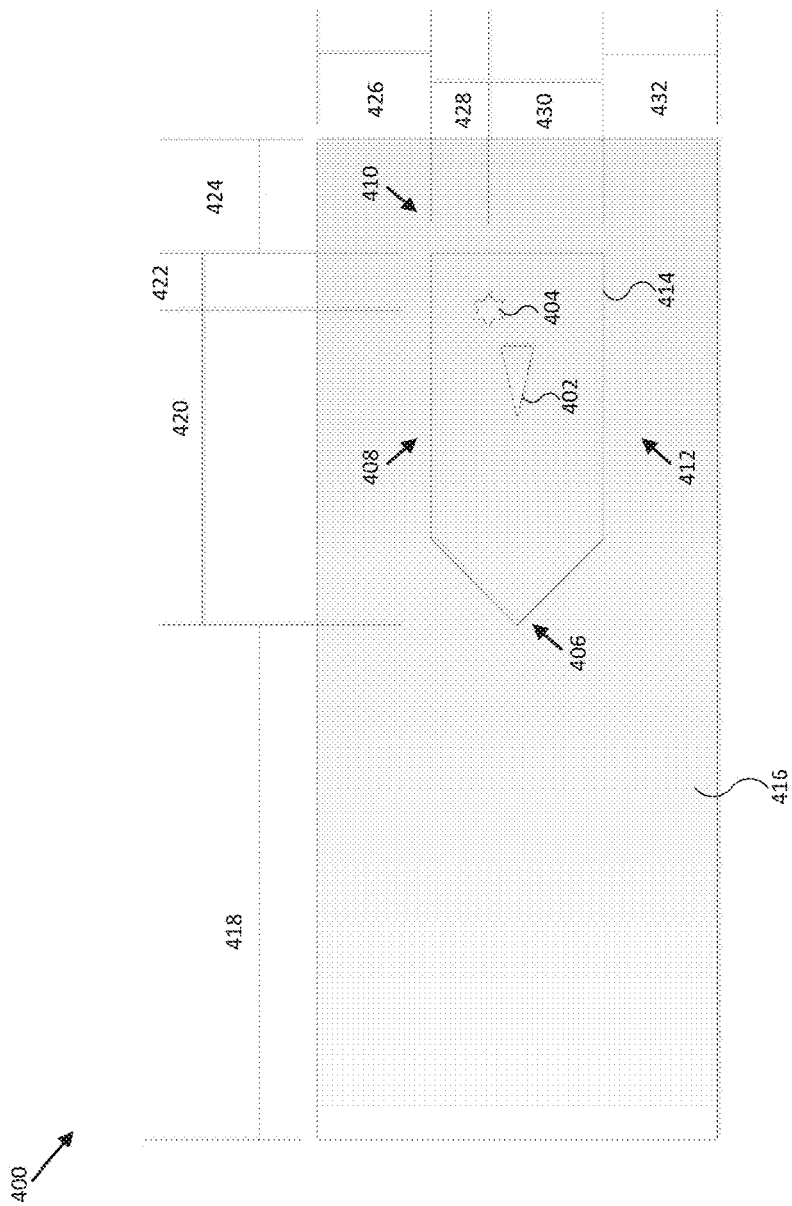
FIG. 4 illustrates image data generated by a collision avoidance system in accordance with an embodiment of the disclosure.

FIG. 4 illustrates image data 400 generated by a collision avoidance system in accordance with an embodiment of the disclosure. In some embodiments, image data 400 may be incorporated with image data 200-202 and/or 300-302 described above in relation to FIGS. 2A-3B. In some instances, mobile target 402 may, for example, take the form of mobile target 306 described above in relation to FIGS. 3A-3B. For example, image data 400 may be presented to a user of mobile structure 304 when a display of user interface 120 is zoomed/scaled to show just the extents of avoidance area 348 and/or 350, such as to provide additional detail during or in expectation of being in close proximity to mobile target 306.

As shown, mobile target 402 may include GPS 404 that may take the form of GPS 146 described above in relation to FIGS. 1A-3B. In some instances, mobile target 402 may be shown with bow 406, starboard 408, stern 410, and/or port 412, which may be generated as image data that may be displayed to a user. In some instances, avoidance area 416 may, for example, take the form of avoidance areas 348, 350, and/or other avoidance areas described above in relation to FIGS. 1A-3B, properly oriented to coincide with corresponding collision points defining avoidance area 416. Further, area 414 describing the physical extents of mobile target 402 may also be designated an avoidance area, similar to avoidance area 416, depending on a configuration of system 100 and/or local ordinances. In some embodiments, area 414 may take form of a cross section of mobile target 402, possibly detected by ranging sensor 148.

In some embodiments, various dimensions of area 414 of mobile target 402 may be determined. In some instances, one or more estimated sizes and/or one or more dimensions of area 414 may be received and/or determined, such as from return signals provided by a radar system and/or an AIS receiver of a collision avoidance system. For example, dimensions 420 and 422 may be received from an AIS receiver, possibly indicating a length of area 414. Further, one or more locations of GPS 404 may also be received from the AIS receiver. As shown, dimension 420 may indicate a distance from bow 406 to GPS 404. Further, dimension 422 may indicate a distance from GPS 404 to stern 410. In some instances, dimensions 428 and 430 may be received from the AIS receiver, possibly indicating a beam width of mobile target 402. As shown, dimension 428 may indicate a distance from starboard 408 to GPS 404. Further, dimension 430 may indicate a distance from GPS 404 to port 412.

In some embodiments, one or more dimensions of avoidance area 416 may be determined from a collision avoidance system, such as the systems described above in relation to FIGS. 1A-3B. For example, such systems may determine dimensions 418, 424, 426, and/or 432 based on an estimated size of mobile target 402 and/or based on dimensions 420, 422, 428, and/or 430. Such systems may also be configured to determine dimensions 418, 424, 426, and/or 432 based on one or more determined velocities of mobile target 402, such as to increase or decrease a bow lead length 418 of avoidance area 416 based on an increased or decreased velocity for mobile target 402. In additional embodiments, such systems may be configured to adjust and/or determine any one of dimensions 418, 424, 426, and/or 432 based on various characteristics of a mobile structure associated with the systems. For example, dimensions 418, 424, 426, and/or 432 may be adjusted according to a length or overall size of mobile structure 101, so as to provide a safety buffer/ avoidance area sized to account for the increased or decreased maneuverability, velocity, and/or other physical or operational characteristics of mobile structure 101, in addition to various characteristics of mobile target 402, as shown in FIG. 4. Optionally, such systems may be configured to adjust and/or determine dimensions 418, 424, 426, and/or 432 based on local regulations, maritime authority regulations, collision avoidance regulations, and/or general practices for reducing and/or eliminating risk of collisions.

In various embodiments, a collision avoidance system may be configured to generate image data 400 of FIG. 4 to illustrate potential collisions, avoidance areas, avoidance courses, and/or other collision avoidance data to a user and/or to help pilot mobile structure 101.

Figure 5:
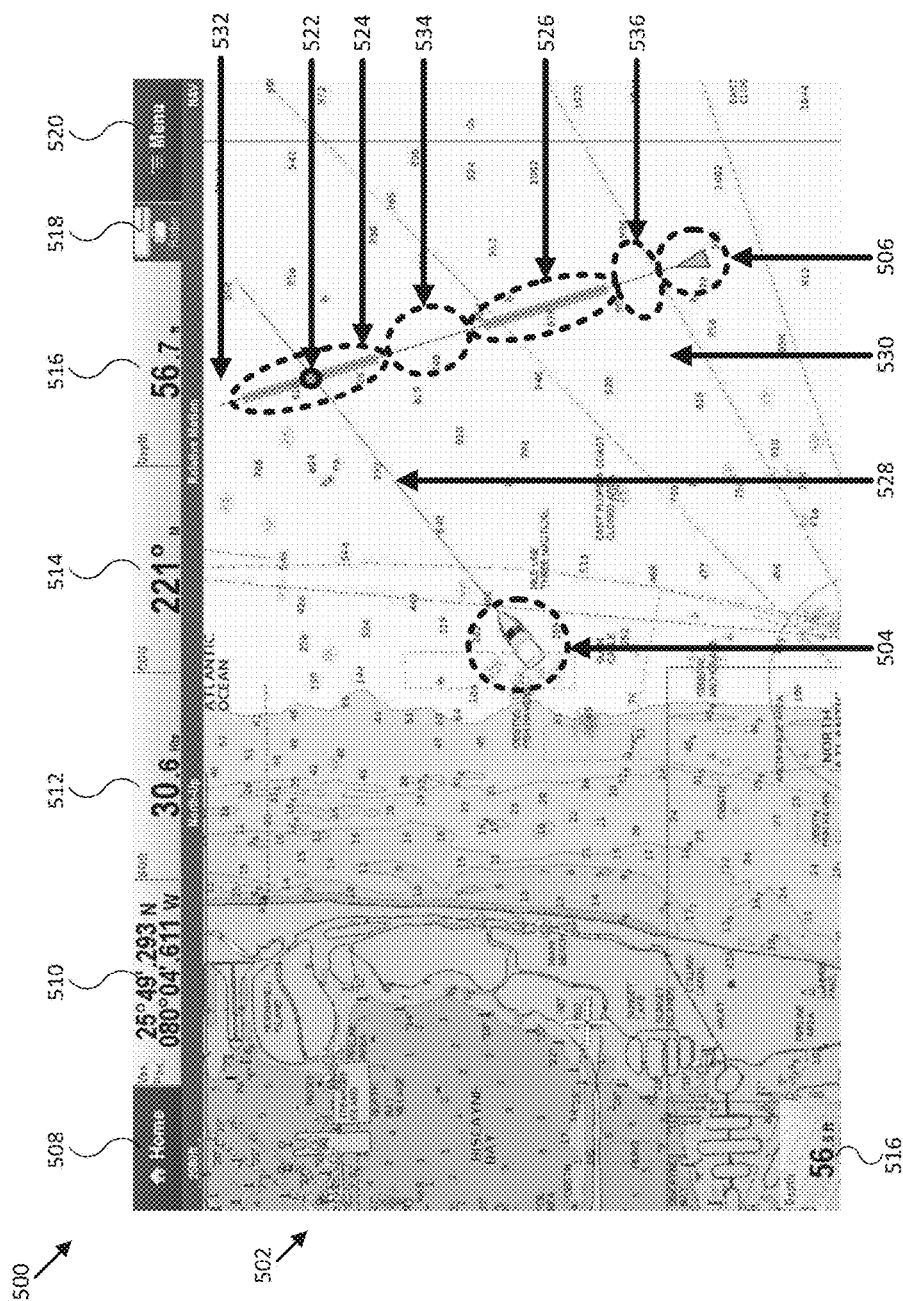
FIG. 5 illustrates image data generated by a collision avoidance system in accordance with an embodiment of the disclosure.

FIG. 5 illustrates image data 500 generated by a collision avoidance system in accordance with an embodiment of the disclosure. In various embodiments, such image data (e.g., including image data 200, 202, 300, 302, 400, and 500) may be rendered and/or displayed to a user via user interface 120 of FIG. 1A. For example, in various embodiments, one or more displays of the user interface 120 may be implemented and/or operated according to any of the systems and methods described in U.S. Provisional Patent Application No. 62/069,170 filed Oct. 29, 2014 and entitled "PILOT DISPLAY SYSTEMS AND METHODS", which is hereby incorporated by reference in its entirety.

In some embodiments, image data 500 may include a variety of touch selectable buttons and/or indicators such as home 508, position 510, speed over ground (SOG) 512, course over ground (COG) 514, depth 516, radar 518, and/or menu 520, as shown. As shown, image data 500 may include chart plot 502, which may include chart data, mapping data, sonar data, radar data, Doppler data, LIDAR data, engine data, navigation data, racing data, numerical data, other types of image data, and/or a combination of such types of data. Further, chart plot 502 may also include bathymetric data, water depth, water temperature, water column/volume debris, bottom profile, and/or various details related to radar, LIDAR, location detection, sonar, and/or other types of image data.

Further, as shown, chart plot 502 may include mobile structure 504 that may, for example, take the form of mobile structure 304 and/or other mobile structures described above in relation to FIGS. 1-4. Further, mobile target 506 may, for example, take the form of mobile target 402, 306, and/or other mobile targets described above in relation to FIGS. 1-4. In some instances, point 522 may be a predicted collision point along predicted course 528 of mobile structure 504 and/or projected course 530 of mobile target 506. Point 522 may, for example, take the form of one or more predicted collision points described above in relation to FIGS. 1-4. Yet further, chart plot 502 may include avoidance areas 524 and 526 that may, for example, take the form of avoidance areas 318 and 320, respectively, and/or other avoidance areas described above in relation to FIGS. 1-4. Yet further, chart plot 502 may include clearance zones 532, 534, and/or 536 that may, for example, take the form of clearance zones 322, 324, and/or 326. In some instances, predicted collision point 522, projected course 530, avoidance areas 522 and/or 526, and/or clearance zones 532, 534, and/or 536 may be determined in any manner described above in relation to FIGS. 1-4.

In some embodiments, chart plot 502 may include an avoidance course. In some instances, the avoidance course may be determined in any manner described above in relation to FIGS. 1-4. In some instances, the avoidance course may update predicted course 528 to traverse projected course 530 through clearance zones 532, 534, and/or 536. Further, a collision avoidance system of mobile structure 504 may pilot, e.g., steer, mobile structure 504 with respect to one or more avoidance courses.

In some embodiments, chart plot 502 may include various risks associated with mobile structure 504 traversing projected course 530. In some instances, such risks may be determined in any manner described above in relation to FIGS. 1-4. For example, chart plot 502 may include a first risk associated with mobile structure 504 traversing projected course 530 through first clearance zone 532, a second risk associated with mobile structure 504 traversing projected course 530 through second clearance zone 534, and/or a third risk associated with mobile structure 504 traversing projected course 530 through third clearance zone 536. In addition, chart plot 502 may include a recommended avoidance course of the one or more avoidance courses for mobile structure 504 based, at least in part, on the first, second, and/or third risks, in addition to other parameters that may be selected by a user, such as maximum velocity, stability requirements, and/or other modes of operation of mobile structure 504. Further, a collision avoidance system of mobile structure 504 may pilot mobile structure 504 according to a course selected based on the first, second, and/or third risks. For example, the second and third risks may be greater than the first risk. As such, the system may pilot mobile structure through first clearance zone 532.

FIG. 6 illustrates image data 600 generated by a collision avoidance system in accordance with an embodiment of the disclosure. In various embodiments, image data 600 may be rendered and/or displayed in simulated three dimensions to a user via user interface 120 of FIG. 1A. Further, image data 600 may include chart plot 602 that may, for example, include one or more forms of data displayed in chart plot 502 described above in relation to FIG. 5.

As shown, image data 602 may include mobile structure 604 that may, for example, take the form of mobile structures described above in relation to FIGS. 1-5. Further, mobile targets 606 and 608 may, for example, take the form of any mobile targets described above in relation to FIGS. 1-5. In some instances, point 616 may be a traversing point along predicted course 610 of mobile structure 604 and/or projected course 614 of mobile target 608. Further, point 618 may be a traversing point along projected course 612 of mobile target 606 and/or projected course 614 of mobile target 608. Further, image data 602 may include avoidance areas 620, 622, 624, and/or 626 that may, for example, take the form of avoidance areas described above in relation to FIGS. 1-5. Yet further, avoidance areas 620, 622, 624, and/or 626 may take the form of three-dimensional avoidance areas, possibly indicating avoidance areas in a three dimensional space.

In some instances, image data 602 may include clearance zone 628 that may, for example, take the form of one or more clearance zones described above in relation to FIGS. 1-5. In some instances, points 616 and/or 618, predicted course 610, projected courses 612 and/or 614, avoidance areas 620-624, and/or clearance zone 628 may be determined in any manner described above in relation to FIGS. 1-5. Yet, in some instances, points 616 and/or 618 may, for example, include one or more predicted collision points described above in relation to FIGS. 1-5.

In some embodiments, predicted course 610 may be an avoidance course of mobile structure 604 that may be determined in any manner described above in relation to FIGS. 1-5. In some instances, predicted course 610 may traverse projected course 614 through clearance zone 628. For example, clearance zone 628 may be located approximately 1 kilometer in front of mobile targets 606 and/or mobile 608. Further, a collision avoidance system of mobile structure 604 may be configured to pilot, e.g., steer, mobile structure 604 with respect to predicted course 610 possibly through clearance zone 628.

In some embodiments, chart plot 602 may include various risks associated with mobile structure 604 traversing projected course 614. In some instances, various risks associated with traversing projected course 614 may be determined in any manner described above in relation to FIGS. 1-5. In addition, chart plot 602 may include a recommended avoidance course of one or more avoidance courses for mobile structure 604 based, at least in part, on the various risks and/or other operational modes of mobile structure 101. Further, a collision avoidance system of mobile structure 604 may pilot, e.g., steer, mobile structure 604 with respect to the various risks and/or operational modes.

In some embodiments, one or more of the avoidance areas may be updated as time evolves and the positions and/or velocities of mobile structure 604 and/or any of mobile targets 606 and 608 changes. For example, one or more of avoidance areas 620, 622, 624, and/or 626 may move, rotate, revolve, curve, shrink, expand, change shape, change colors, and/or update in other manners. Further, one or more of avoidance areas 620, 622, 624, and/or 626 may update based on updated velocities, updated relative positions, and/or updated estimated sizes of mobile targets 606, 608, and/or mobile structure 604. For example, a collision avoidance system may include ranging sensor 148. Further, the system may determine one or more updated projected courses for mobile targets 606 and/or 608 detected by ranging sensor 148, where the updated projected courses may include an updated velocity and/or position of mobile targets 606 and/or 608. Further, the system may receive an updated speed, position, and/or orientation of mobile structure 604 from SPOS 140. Yet further, the system may determine one or more of updated avoidance areas 620, 622, 624, and/or 626 based, at least in the part, on the one or more updated projected courses for mobile targets 606 and/or 608, and/or the updated speed, position, and/or orientation of mobile structure 604. Yet further, the system may generate updated image data based, at least in part, on the updated projected course and/or the one or more updated avoidance areas.

In some embodiments, a turning rate of a mobile target may be determined. For example, a turning rate may include a rate of turn (ROT), standard rate of turn, and/or other turning references for changing one or more directions of one or more mobile targets. Further, a turning rate may include a tapering geometry based on the possibility of a mobile target turning, possibly anticipating the turn before it occurs. In some instances, the turning rate may be represented in degrees per second. In some embodiments, the system may determine one or more turning rates of mobile targets 606 and/or 608 based, at least in part, on projected courses 612 and/or 614 of mobile targets 606 and/or 608, respectively. For example, the rate of turn may be received/determined from return signals received by ranging sensor 148 and/or an AIS of ranging sensor 148. Further, the system may determine a curvature for one or more of avoidance areas 620, 622, 624, and/or 626 corresponding to the determined turning rate. Yet further, the system may determine an avoidance course for mobile structure 604 based, at least in part, on the determined curvature. It should be noted that avoidance areas 620, 622, 624, and/or 626 may exhibit updated curves based on the updated velocities, updated relative positions, and/or updated estimated sizes of mobile targets 606, 608, and/or mobile structure 604.

Figure 7:
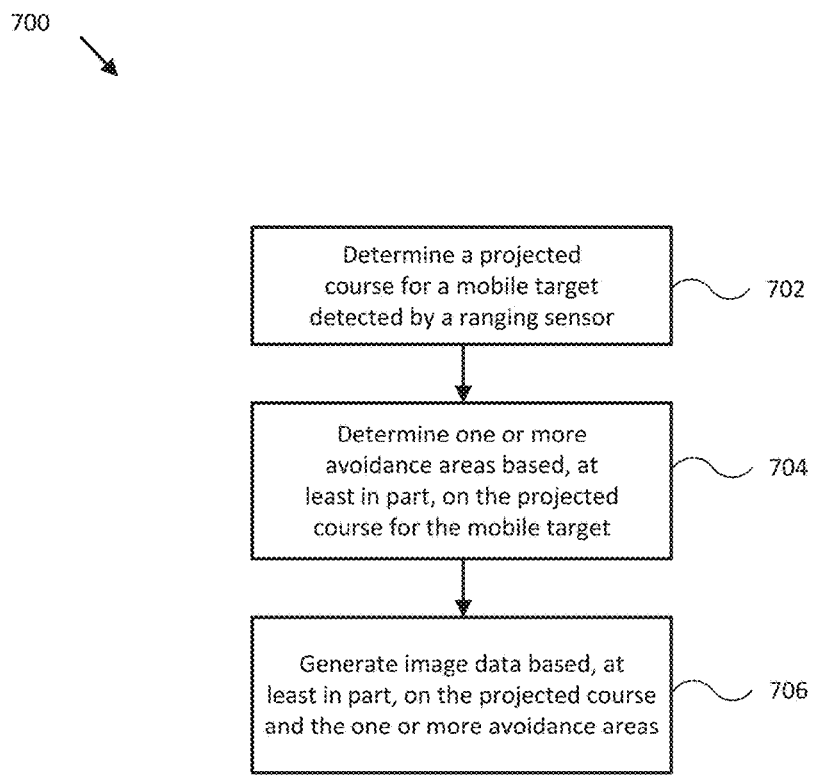
FIG. 7 illustrates a flow diagram of various operations to operate a collision avoidance system in accordance with an embodiment of the disclosure.

Turning now to FIG. 7, FIG. 7 illustrates a flow diagram of process 700 to provide image data for mobile structure 101 in accordance with embodiments of the disclosure. In some embodiments, the operations of FIG. 7 may be implemented as software instructions executed by one or more logic devices associated with corresponding electronic devices, sensors, and/or structures depicted in FIGS. 1A through 6. More generally, the operations of process 700 may be implemented with any combination of software instructions and/or electronic hardware (e.g., inductors, capacitors, amplifiers, actuators, or other analog and/or digital components).

It should be appreciated that any step, sub-step, sub-process, or block of process 700 may be performed in an order or arrangement different from the embodiment illustrated by FIG. 7. For example, in other embodiments, one or more blocks may be omitted from or added to the process. Furthermore, block inputs, block outputs, various sensor signals, sensor information, calibration parameters, and/or other operational parameters may be stored to one or more memories prior to moving to a following portion of a corresponding process. Although process 700 is described with reference to systems described in reference to FIGS. 1A-6, process 700 may be performed by other systems and/or operated to generate image data different from those in FIGS. 1A-6 and including a different selection of electronic devices, sensors, assemblies, mobile structures, mobile structure attributes, and/or image data constituents.

Process 700 represents a method for generating image data 300, 302, 400, 500, and/or 600 via user interfaces 120/130 in accordance with embodiments of the disclosure. At the initiation of process 700, various system parameters may be populated by prior execution of a process similar to process 700, for example, or may be initialized to zero and/or one or more values corresponding to typical, stored, and/or learned values derived from past operation of process 700, as described herein.

In block 702, a logic device determines a projected course for a mobile target detected by a ranging sensor. For example, controller 130 of systems 100 or 100B may be configured to determine a projected course of a mobile target detected by ranging sensor 148. In some embodiments, ranging sensor 148 may include a radar system, and controller 130 may be configured to receive one or more relative positions and/or a cross section of the mobile target from the radar system. In such embodiments, controller 130 may determine a velocity and/or an estimated size of the mobile target based, at least in part, on the received relative positions and/or cross section. In other embodiments, ranging sensor 148 may include an AIS or ACARS receiver, and controller 130 may be configured to receive positions and/or a size (e.g., one or more dimensions, such as a length and/or a width) of the mobile target from the AIS or ACARS receiver. In such embodiments, controller 130 may be configured to determine relative positions of the mobile target from the received positions and measured positions of the mobile structure, for example, and then to determine a velocity of the mobile target based, at least in part, on the determined relative positions. Yet further, controller 130 may determine the projected course and/or one or more avoidance areas based, at least in part, on the determined velocity and/or the estimated size of the mobile target.

In block 704, a logic device determines one or more avoidance areas based, at least in part, on the projected course for the mobile target. For example, the projected course may include a velocity of the mobile target, such as a velocity provided by AIS data or a velocity determined by multiple emissions and receptions of radar data, for example. In some instances, controller 130 may determine one or more predicted collision points between the mobile target and mobile structure 101 and along the projected course based, at least in part, on the velocity of the mobile target. Further, controller 130 may determine the one or more avoidance areas based, at least in part, on the one or more predicted collision points.

In some embodiments, one or more predicted collision points may include first and second collision points and one or more avoidance areas may include first and second avoidance areas. Further, controller 130 may receive one or more dimensions of the mobile target from an AIS receiver of ranging sensor 148. Yet further, controller 130 may determine first and second avoidance areas based, at least in part, on first and second collision points and the one or more dimensions of the mobile target. Further, controller 130 may determine a clearance zone between the first and second avoidance areas. Further, controller 130 may generate image data based, at least in part, on the clearance zone, possibly to render the image data on a display.

In block 706, a logic device generates image data based, at least in part, on the projected course and the one or more avoidance areas. For example, controller 130 may be configured to generate and/or render the image data that includes the one or more avoidance areas. Further, controller 130 may be configured to render the one or more avoidance areas via one or more displays of user interface 120.

In some embodiments, controller 130 may receive one or more dimensions of the mobile target from the AIS receiver. Further, controller 130 may determine the one or more avoidance areas based, at least in part, on the one or more dimensions of the mobile target. Yet further, controller 130 may determine an avoidance course for mobile structure 101 to avoid the one or more avoidance areas. In addition, controller 130 may pilot, via steering sensor/actuator 150 and/or propulsion system 170, mobile structure 101 according to the avoidance course.

In some embodiments, the one or more avoidance areas may include first and second avoidance areas along a projected course of the mobile target. Further, the first avoidance area may be further from the detected mobile target than the second avoidance area. Yet further, controller 130 may determine a first clearance zone along the projected course that is farther from the detected mobile target than the first avoidance area. In some instances, controller 130 may determine a second clearance zone between the first avoidance area and the second avoidance area. Further, controller 130 may determine a third clearance zone separate from the first clearance zone and/or second clearance zone. For example, the third clearance zone may be between the second avoidance area and the mobile target. Yet further, controller 130 may determine one or more avoidance courses for mobile structure 101 based, at least in part, on the first, second, and/or third clearance zones.

In some embodiments, controller 130 may determine a first risk associated with mobile structure 101 traversing the projected course through the first clearance zone, a second risk associated with mobile structure 101 traversing the projected course through the second clearance zone, and/or a third risk associated with mobile structure 101 traversing the projected course through the third clearance zone. Further, controller 130 may determine a recommended avoidance course of the one or more avoidance courses for mobile structure 101 based, at least in part, on the first, second, and/or third risks.

In some embodiments, controller 130 may receive a speed, position, and/or orientation of mobile structure 101. Further, controller 130 may determine the one more avoidance areas based, at least in part on the projected course for the mobile target and the received speed, position, and/or orientation of mobile structure 101.

In some embodiments, controller 130 may determine an updated projected course for the mobile target detected by ranging sensor 148, where the updated projected course may include an updated velocity and/or position of the mobile target. Further, controller 130 may receive an updated speed, position, and/or orientation of mobile structure 101 from the SPOS. Yet further, controller 130 may determine one or more updated avoidance areas based, at least in the part, on the updated projected course for the mobile target and/or the updated speed, position, and/or orientation of mobile structure 101. In addition, controller 130 may generate updated image data based, at least in part, on the updated projected course and/or the one or more updated avoidance areas.

In some embodiments, controller 130 may determine a turning rate of the mobile target based, at least in part, on the projected course of the mobile target. Further, controller 130 may determine a curvature for at least one of the one or more avoidance areas corresponding to the determined turning rate. Yet further, controller 130 may determine an avoidance course for mobile structure 101 based, at least in part, on the determined curvature. In some instances, controller 130 may generate the image data based, at least in part, on the determined curvature of at least one avoidance area.

In some embodiments, controller 130 may receive one or more dimensions of mobile structure 101 from a memory configured to store one or more dimensions of mobile structure 101. Further, controller 130 may determine an avoidance course for mobile structure 101 to avoid the one or more avoidance areas, where the avoidance course is based, at least in part, on the one or more dimensions of mobile structure 101. Yet further, controller 130 may generate the image data based, at least in part, on the avoidance course, where the generated image data may include the avoidance course for mobile structure 101.

In some embodiments, mobile structure 101 may include ranging sensor 148 and a speed, position, and/or orientation sensor (SPOS) 140. Further, mobile structure 101 may include a watercraft, where SPOS 140 may include GPS 146, gyroscope/accelerometer 144, and/or a compass, and ranging sensor 148 may include a radar system and/or an AIS receiver.

In some embodiments, controller 130 may determine one or more collision points along the projected course of the mobile target based on the following equation:

$$t = \frac{-\vec{RP}\cdot\vec{V_1} \pm \sqrt{\left(\vec{RP}\cdot\vec{V_1}\right)^2 - (|V_1^2|-|V^2|)\cdot\vec{RP}^2}}{|V_1^2|-|V^2|}$$ (Equation 2.12)

As noted, the t is time, the $\vec{RP}$ is a position of mobile structure 101 relative to a position of the mobile target, the $\vec{V_1}$ is a velocity vector of the mobile target, e.g., a direction of the mobile target, the $V_1$ is a velocity magnitude of the mobile target, and the V is a velocity magnitude of mobile structure 101.

It is contemplated that any one or combination of methods to provide avoidance areas may be performed according to one or more operating contexts of a control loop, for example, such as a startup, learning, running, and/or other type operating context. For example, process 700 may proceed back to block 702 and proceed through process 700 again to produce updated avoidance areas, as in a control loop.

Figure 8:
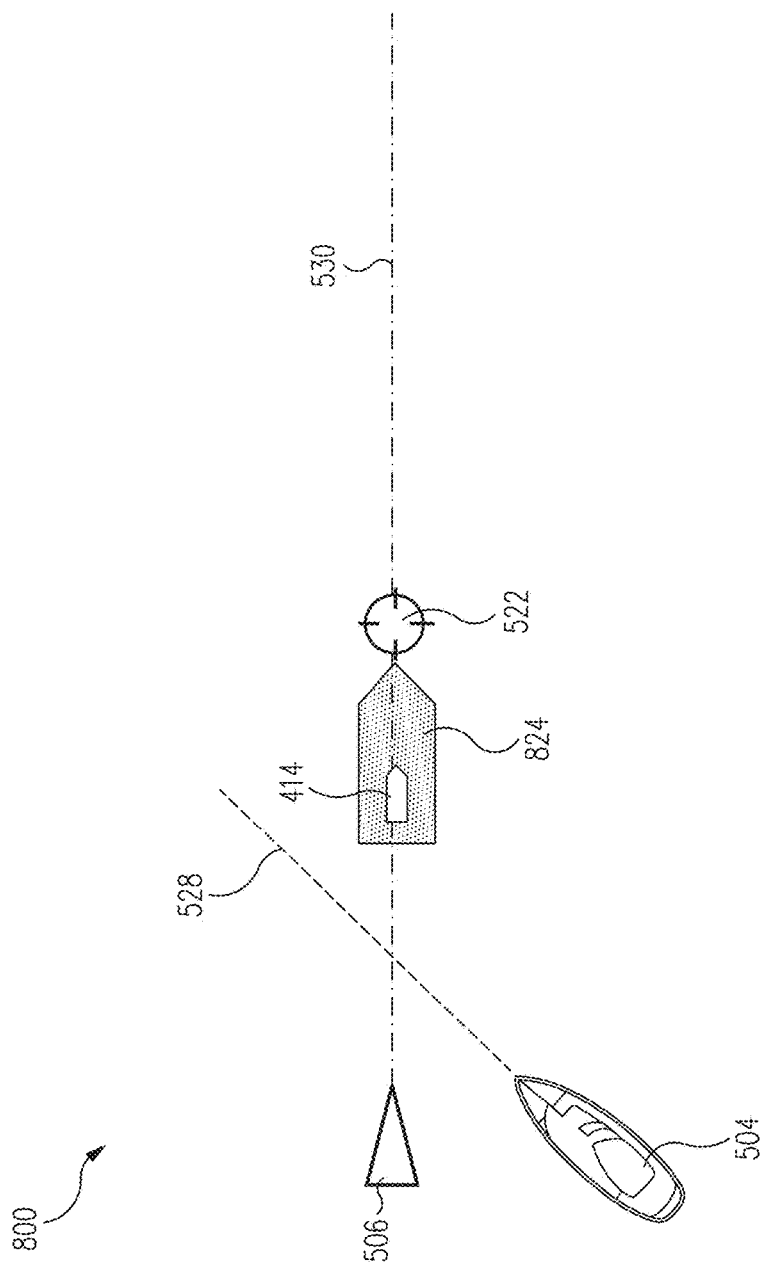
FIG. 8 illustrates image data generated by a collision avoidance system in accordance with an embodiment of the disclosure.

FIG. 8 illustrates image data 800 generated by a collision avoidance system in accordance with an embodiment of the disclosure. Such image data (e.g., including embodiments of image data 200, 202, 300, 302, 400, 500, and/or 600) may be rendered and/or displayed to a user via user interface 120 of FIG. 1A. In various embodiments, image data 800 may be combined with a chart plot (e.g., such as chart plot 502 and/or 602) that may include one or more forms of data displayed in chart plot 502 described above in relation to FIG. 5 and/or displayed in chart plot 602 described above in relation to FIG. 6, for example, and/or may include various other characteristics of chart plot 502 and/or 602, as described herein.

Essentially, FIG. 8 presents an embodiment of an arrangement of image data that may be presented to a user of a mobile structure to help provide collision awareness/avoidance information while operating the mobile structure. In particular, while FIGS. 2-6 illustrate arrangements of image data that provide complete collision awareness, such as including all available avoidance areas and clearance zones, FIG. 8 illustrates a simplified view that eliminates some image data useful for planning future maneuvers, such as avoidance areas 524 and 526 and clearance zones 532, 534, and 536 of FIG. 5, and includes one or more predicted collision points and a single limited avoidance area that is displayed when a projected course for a mobile target crosses (or approaches within a predetermined distance) a predicted course for the mobile structure with which the collision awareness is integrated.

To explain, FIGS. 3A-6 illustrate various avoidance areas (e.g., avoidance areas 318, 320, 348, 350, 416, 524, 526, 620, 622, 624, and 626) that are typically larger and often much larger than the general physical extents of corresponding mobile targets (e.g., area 414 shown in FIG. 4) and/or most fixed/regulatory safety margins about the physical extents of the mobile targets. This is primarily due to the non-linear aspects of Eq. 2.7, which helps determine the size of the avoidance areas. The image data presented in FIGS. 2A-6 works at an intuitive level because all possible headings for the mobile structure (e.g., the structure being piloted to avoid a collision) are accounted for simultaneously by the extents of the avoidance areas; the heading of the mobile structure is a degree of freedom with respect to Eq. 2.7. FIGS. 8-9F present image data that is relatively simplified so as to reduce the amount of image data that must be interpreted by a user and/or an autopilot of the mobile structure. Generation of such simplified image data may be selectively enabled by a user, for example, or may be enabled automatically (e.g., by controller 130) when a mobile structure approaches within a predetermined minimum distance of a mobile target, when the number of detected mobile targets is above a predetermined threshold limit, when a detected collision or interception is imminent, and/or when other navigational safety risks and/or system parameters are detected.

More specifically, FIGS. 8-9F illustrate image data including a single limited avoidance area 824 that, by negative inference, generally indicates all concurrent available clearance zones (e.g., all portions of projected course 530 not shown overlaid by limited avoidance area 824. In general, limited avoidance area 824 may be configured to indicate a general location of mobile target 506 and/or a proximity of mobile target 506 to mobile structure 504 as mobile structure 504 approaches projected course 530 while travelling along predicted course 528. To place limited avoidance area 824 properly within image data 800, the current velocity/course (e.g., speed and heading) of mobile structure 504 should be known. Using the current course of mobile structure 504, a collision avoidance system may determine the position of limited avoidance area 824 along projected course 530 that indicates the limited avoidance area associated with mobile target 506, and, in some embodiments, the physical extents of mobile target by area 414, at a specified future time. For example, the position of mobile target 506 may be determined from a variation of Eq. 2.8:

$$\vec{P_1}' = \vec{RP} + \vec{V_1}\cdot t$$ (Equation 2.13), where $\vec{P_1}'$ is the future position of mobile target 506 at future time t.

In various embodiments, the specific future time may be selected as the time at closest point of approach (e.g., between the centers of mobile structure 504 and mobile target 506, the physical extents of mobile structure 504 and mobile target 506, other portions of either mobile structure 504 or mobile target 506, or any combination of those), the time at intersection of predicted course 528 and projected course 530, and/or other selected times based, at least in part, on predicted course 528 and/or projected course 530.

For example, the time of closest point of approach between the centers of mobile structure 504 and mobile target 506 may be calculated using the following equation:

$$Tcpa = -\vec{RP} \cdot (\vec{V_1} - \vec{V})/|\vec{V_1} - \vec{V}|^2 \quad \text{(Equation 2.14)}$$

In various embodiments, the image data presented in FIGS. 8-9F can help a user of mobile structure 504 to understand the instantaneous and predicted future proximity to mobile target 506. As show in FIGS. 8-9F, limited avoidance area 824 is linear and to-scale because Eq. 2.13 is linear.

As presented in FIG. 8-9F, the display of such image data can be iterative; if mobile structure 504 changes course to pilot around limited avoidance area 824, limited avoidance area 824 may move along projected course 530 to compensate for the new course of mobile structure 504. This movement of limited avoidance area 824 may place limited avoidance area 824 in the path of mobile structure 504, and additional course corrections may be needed to change course sufficiently to avoid risk of collision with mobile target 506. The final solution of the safe course is the same solution as that presented by the more complete image data presented in FIGS. 2A-6, but course corrections made using image data as presented in FIGS. 8-9F may require multiple adjustments because the complete collision awareness is not presented.

As shown in FIG. 8, image data 800 may show mobile structure 504 travelling along predicted course 528 and mobile target travelling along projected course 530. In various embodiments, limited avoidance area 824, area 414, and/or predicted collision point 522 may be selectively rendered when predicted course 528 and projected course 530 intersect, such as within a selected intercept distance and/or if one or both mobile structure 504 and mobile target 506 have speeds (e.g., SOG and/or speed through water) above a preselected threshold. In general, each element of image data 800 may be updated continuously as new positions, courses, and/or speeds are received, as described herein.

As described herein, predicted course 528 may be determined from a current speed and/or heading for mobile structure 504, and projected course 506 may be received and/or determined from return signals provided by a radar system and/or an AIS receiver of a collision avoidance system. Position and/or shape of area 414, limited avoidance area 824, and/or predicted collision point 522 may be determined, at least in part, from predicted course 528, projected course 530, and/or return signals provided by a radar system and/or an AIS or ACARS receiver of a collision avoidance system. If predicted course 528 and projected course 530 are determined to intersect or approach within a predetermined minimum distance, area 414, limited avoidance area 824, and/or predicted collision point 522 may be rendered such that a skipper and/or autopilot of mobile structure 504 can ensure avoidance of collision with mobile target 506 by avoiding area 414, limited avoidance area 824, and/or predicted collision point 522 (e.g., aiming for a clearance zone, such as those described in more detail with respect to FIG. 5).

For example, limited avoidance area 824 may include a shape configured to provide a safety margin about area 414, which may in some embodiments roughly correspond to the physical extents of mobile target 506 (e.g., to indicate an orientation of mobile target 506, for example), and limited avoidance area 824 may be rendered/generated at a position configured to indicate whether mobile structure 504 will pass ahead or astern of mobile target 506 when crossing projected course 530. Predicted collision point 522 and/or other predicted collision points may be sized/configured to indicate a potential collision regardless of the scaling of image data 800, such as when limited avoidance area 824 is scaled too small to be easily viewable by a user viewing user interface 120. In various embodiments, predicted collision point 522 and/or additional predicted collision points may be rendered at positions along projected course 530 based on the current position and/or speed (e.g., and not heading) of mobile structure 504 relative to projected course 530. In such embodiments, predicted collision point 522 (and/or other collision points) may be configured to indicate positions at which mobile structure 504 would risk collision with mobile target 506 if mobile structure 504 were steered to intersect projected course 530 at the current speed of mobile structure 504. In related embodiments, predicted collision point 522 may be configured to indicate a rendezvous point (e.g., a desired close proximity) between mobile structure 504 and mobile target 506.

Figure 9A:
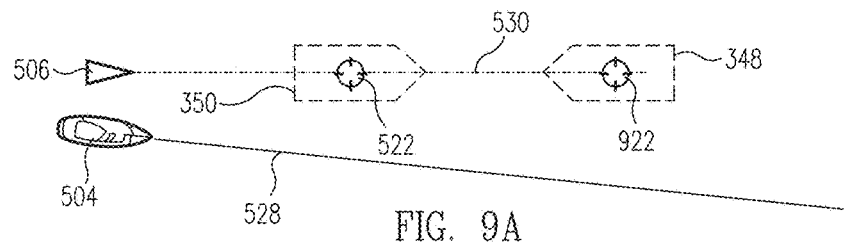
FIGS. 9A-F illustrate image data generated by a collision avoidance system in accordance with an embodiment of the disclosure.
Figure 9B:
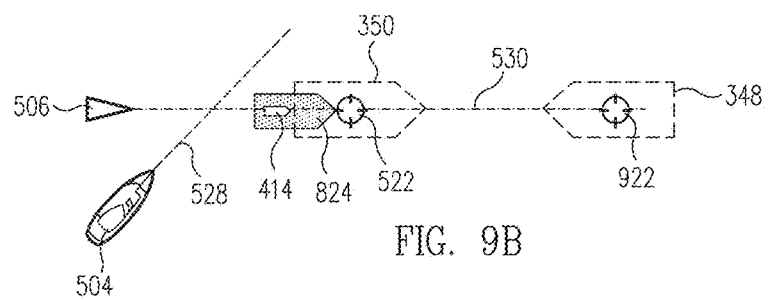
Figure 9C:
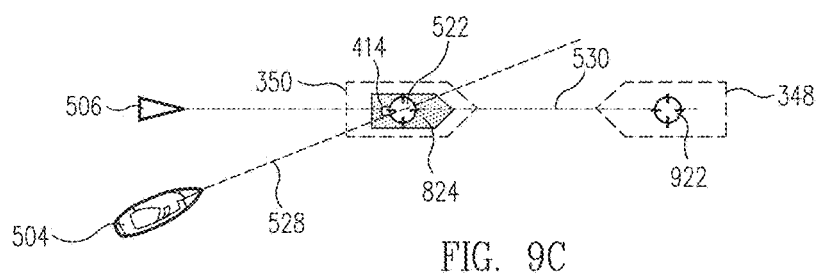
Figure 9D:
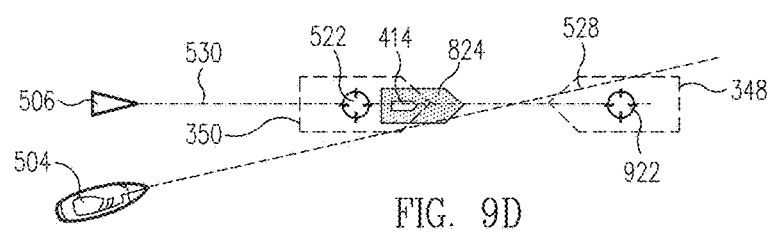
Figure 9E:
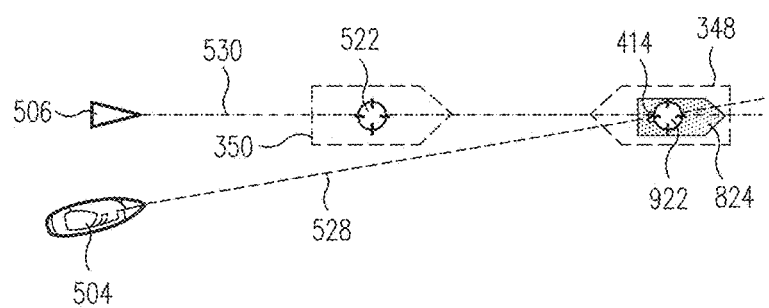
Figure 9F:
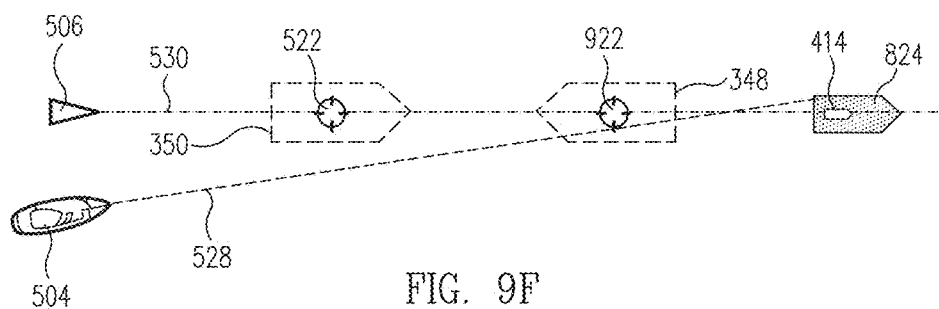

FIGS. 9A-F illustrate image data generated by a collision avoidance system in accordance with an embodiment of the disclosure. In particular, each of FIGS. 9A-E present image data similar to image data 800 of FIG. 8 that may be rendered according to a particular scenario. For example, FIG. 9A presents image data that may be rendered by a display of user interface 120 when predicted course 528 and projected course 530 do not intersect. As described herein, predicted collision points 522 and/or 922 may be rendered to indicate positions at which mobile structure 504 would risk collision with mobile target 506 if mobile structure 504 were steered to intersect projected course 530 at the current speed of mobile structure 504.

Also shown in FIGS. 9A-F, though not included in the image data generated and/or provided to a user of mobile structure 504 in the embodiments presented by FIGS. 9A-F, are avoidance areas 348 and 350, which roughly correspond to avoidance areas 348 and 350 of FIG. 3B and are provided for qualitative comparison to the alternative embodiments presented in FIGS. 2A-6. Avoidance areas 348 and 350 are shown in dashed lines to indicate where and how avoidance areas 348 and 350 would be included in the image data presented in FIG. 9A if the image data were generated to indicate the complete collision awareness provided by, for example, embodiments presented in FIGS. 2A-6. In typical embodiments, avoidance areas 348 and 350 are not included in the simplified image data, as described herein.

FIG. 9B presents image data that may be rendered when predicted course 528 intersects projected course 530 and passes behind the projected position of mobile target 506 at the intersection time, as indicated by limited avoidance area 824 and/or area 414. In a similar fashion, FIG. 9C shows image data that may be rendered when mobile structure 504 and mobile target 506 are projected to collide at collision point 522, and FIG. 9D shows image data that may be rendered when predicted course 528 intersects projected course 530 and passes ahead of the projected position of mobile target 506 at the intersection time, and behind predicted collision point 922. FIG. 9E shows image data that may be rendered when mobile structure 504 and mobile target 506 are projected to collide at collision point 922, and FIG. 9F shows image data that may be rendered when predicted course 528 intersects projected course 530 and passes ahead of the projected position of mobile target 506 at the intersection time, and ahead of predicted collision point 922.

FIG. 10 illustrates image data 1000 generated by a collision avoidance system in accordance with an embodiment of the disclosure. Such image data (e.g., including embodiments of image data 200, 202, 300, 302, 400, 500, 600, and/or 800) may be rendered and/or displayed to a user via user interface 120 of FIG. 1A. Further, image data 800 may be combined with a chart plot (e.g., such as chart plot 502 and/or 602) that may include one or more forms of data displayed in chart plot 502 described above in relation to FIG. 5 and/or displayed in chart plot 602 described above in relation to FIG. 6, for example, and/or include various other characteristics of chart plot 502 and/or 602, as described herein.

Essentially, FIG. 10 presents an embodiment of an arrangement of image data that may be presented to a user of a mobile structure to help provide collision awareness/avoidance information while operating the mobile structure and desiring to rendezvous with and/or intercept a mobile target. As shown in FIG. 10, image data 1000 may show mobile structure 504 travelling along predicted course 528 and mobile target travelling along projected course 530. In various embodiments, predicted collision point 1022 may be selectively rendered when a user selects a rendezvous mode for a collision system, for example, and mobile structure 504 and/or mobile target 506 are within a selected intercept distance and/or if one or both mobile structure 504 and mobile target 506 have speeds (e.g., SOG and/or speed through water) above a preselected threshold.

In various embodiments, the position of predicted collision point 1022 may be determined using the same or similar methods described above in relation to determining position of any predicted collision points (e.g., predicted collision points 208, 218, 308-314, 328-334, 336-342, 522, and/or other points described in FIGS. 2A-6). For example, a position of predicted collision point 1022 may be determined from the current position and speed (e.g., and not current heading) of mobile structure 504, for example, and projected course 530. Once the position of predicted collision point 1022 is determined, a controller of mobile structure 504 (e.g., controller 130) may be configured to determine an interdiction course to collision point 1022 to allow mobile structure 504 to intercept mobile target 506. For example, in some embodiments, the interdiction course may include a curved and/or straight line course to collision point 1022 (e.g., selected as the nearest, most easily reached, least fuel expended to reach, and/or other criteria selected predicted collision point) configured to place mobile structure 504 alongside mobile target 506, to place a bow of mobile structure 504 substantially adjacent a stern or side of mobile target 506, to place a center of mobile structure 504 substantially adjacent a bow of mobile target 506, and/or to place any selected portion of mobile structure 504 adjacent any selected and discernable portion of mobile target 506 (e.g., discernable from returns provided to ranging sensor 148). In general, an interdiction course may be determined and/or implemented using similar methods as those described with respect to determining and/or implementing an avoidance course, but with the goal of placing mobile structure 504 in proximity to mobile target 506.

Similar with respect to rendering of predicted collision points 522 and 922 in FIGS. 8-9F, predicted collision point 1022 may be sized/configured to indicate a potential rendezvous or intercept regardless of the scaling of image data 1000, such as when a user zooms in or out on a chart to contract or expand a view of a navigational environment about mobile structure 504. For example, collision point 1022 may be rendered with the same apparent size, as displayed by user interface 120, across multiple different expanded or contracted views of image data 1000. In general, each element of image data 1000 may be updated continuously as new positions, courses, and/or speeds are received, as described herein.

Embodiments of the present disclosure can thus provide avoidance areas rendered in a highly intuitive form that can be easily and quickly comprehended by a user or pilot of a mobile structure. Such embodiments may provide image data to assist in navigation of a mobile structure, survey of a body of water, and/or to assist in the operation of other systems, devices, and/or sensors coupled to the mobile structure.

Where applicable, various embodiments provided by the present disclosure can be implemented using hardware, software, or combinations of hardware and software. Also where applicable, the various hardware components and/or software components set forth herein can be combined into composite components comprising software, hardware, and/or both without departing from the spirit of the present disclosure. Where applicable, the various hardware components and/or software components set forth herein can be separated into sub-components comprising software, hardware, or both without departing from the spirit of the present disclosure. In addition, where applicable, it is contemplated that software components can be implemented as hardware components, and vice-versa.

Software in accordance with the present disclosure, such as non-transitory instructions, program code, and/or data, can be stored on one or more non-transitory machine readable mediums. It is also contemplated that software identified herein can be implemented using one or more general purpose or specific purpose computers and/or computer systems, networked and/or otherwise. Where applicable, the ordering of various steps described herein can be changed, combined into composite steps, and/or separated into sub-steps to provide features described herein.

Embodiments described above illustrate but do not limit the invention. It should also be understood that numerous modifications and variations are possible in accordance with the principles of the invention. Accordingly, the scope of the invention is defined only by the following claims.

What is claimed is:

1. A system comprising:
a user interface configured to receive user input and provide user feedback with respect to a mobile structure; and
a controller configured to communicate with the user interface, a ranging sensor, and a speed, position, and orientation sensor (SPOS) mounted to the mobile structure, wherein the controller is configured to:
receive a detection of a mobile target from the ranging sensor;
determine a projected course for the mobile target detected by the ranging sensor;
determine at least first and second avoidance areas based, at least in part, on the projected course for the mobile target, one or more dimensions of the mobile target, and a speed, position, and orientation of the mobile structure provided by the SPOS, wherein each of the first and second avoidance areas comprise an avoidance area length comprising an adjustable lead length extending along a direction of motion of the mobile target that is adjustable based, at least in part, on the projected course for the mobile target;
generate image data based, at least in part, on the projected course, the first and second avoidance areas, and the speed, position, and orientation of the mobile structure, wherein the image data indicates at least the first and second avoidance areas; and
render the image data via at least one display of the user interface.

2. The system of claim 1, wherein the ranging sensor comprises a radar system configured to detect one or more relative positions and/or a cross section of the mobile target, and wherein the controller is configured to:
receive the one or more relative positions and/or the cross section of the mobile target from the radar system;
determine a velocity and/or an estimated size of the mobile target based, at least in part, on the received relative positions and/or cross section; and
determine the projected course and/or the first and second avoidance areas based, at least in part, on the determined velocity and/or the estimated size of the mobile target.

3. The system of claim 1, wherein the projected course comprises a velocity of the mobile target, and wherein the controller is configured to:
determine one or more predicted collision points between the mobile target and the mobile structure and along the projected course based, at least in part, on the velocity of the mobile target; and
determine the first and second avoidance areas based, at least in part, on the one or more predicted collision points.

4. The system of claim 3, wherein the ranging sensor comprises an Automatic Identification System (AIS) receiver, and wherein the controller is configured to:
determine the projected course for the mobile target from signals provided by the AIS receiver;
determine a clearance zone between the first and second avoidance areas; and
generate the image data based, at least in part, on the clearance zone.

5. The system of claim 3, wherein:
the one or more predicted collision points comprise first and second centroid predicted collision points between the mobile target and the mobile structure, and the controller is configured to determine the first and second avoidance areas based on extending the first and second centroid predicted collision points about the projected course according to the one or more dimensions of the mobile target and the adjustable lead length, wherein the adjustable lead length is based on the velocity of the mobile target and/or safety regulations associated with reducing a risk of collisions; or
the one or more predicted collision points each correspond to at least one of the one or more dimensions of the mobile target, and the controller is configured to determine the first and second avoidance areas based on determining positions for each of the one or more predicted collision points and grouping the positions for each of the one or more predicted collision points according to a corresponding predicted collision time and/or the one or more dimensions of the mobile target and the adjustable lead length, wherein the adjustable lead length is based on the velocity of the mobile target and/or safety regulations associated with reducing a risk of collisions.

6. The system of claim 1, wherein the ranging sensor comprises an Automatic Identification System (AIS) receiver, and wherein the controller is configured to:
receive one or more dimensions of the mobile target from the AIS receiver;
determine the first and second avoidance areas based, at least in part, on the one or more dimensions of the mobile target and/or one or more characteristics of the mobile structure;
determine an avoidance course for the mobile structure to avoid the first and second avoidance areas; and
generate the image data based, at least in part, on the avoidance course.

7. The system of claim 1, further comprising a steering sensor/actuator and/or a propulsion system for the mobile structure, wherein the controller is configured to:
determine one or more predicted collision points between the mobile target and the mobile structure and along the projected course;
determine an interdiction course to one of the one or more predicted collision points; and
pilot the mobile structure along the interdiction course to intercept the mobile target at the one of the one or more predicted collision points, using the steering sensor/actuator and/or the propulsion system.

8. The system of claim 1, wherein the first avoidance area is further from the detected mobile target than the second avoidance area, and the controller is configured to:
determine first, second, and/or third clearance zones along the projected course that are outside the first and second avoidance areas, wherein the first clearance zone is further from the mobile target than the first avoidance area, the second clearance zone is between the first avoidance area and the second avoidance area, and the third clearance zone is separate from the first and second clearance zones; and
determine one or more avoidance courses for the mobile structure based, at least in part, on the first, second, and/or third clearance zones.

9. The system of claim 8, wherein the controller is configured to:
determine first, second, and/or third risks of collision associated with the mobile structure traversing the projected course through the first, second, and/or third clearance zones; and
determine a recommended avoidance course comprising one of the one or more determined avoidance courses for the mobile structure based, at least in part, on the first, second, and/or third risks of collision.

10. The system of claim 1, further comprising the ranging sensor, wherein the controller is configured to:
determine an updated projected course for the mobile target detected by the ranging sensor, wherein the updated projected course comprises an updated position and/or velocity of the mobile target;
receive an updated speed, position, and/or orientation of the mobile structure from the SPOS;
determine first and second updated avoidance areas based, at least in part, on the updated projected course for the mobile target and/or the updated speed, position, and/or orientation of the mobile structure; and
generate updated image data based, at least in part, on the updated projected course, the first and second updated avoidance areas, and/or the updated speed, position, and/or orientation of the mobile structure.

11. The system of claim 1, wherein the controller is configured to:
determine a turning rate of the mobile target based, at least in part, on the projected course of the mobile target;
determine a curvature for at least one of the first and second avoidance areas corresponding to the determined turning rate; and generate the image data based, at least in part, on the determined curvature of the at least one of the first and second avoidance areas.

12. The system of claim 1, further comprising a memory configured to store one or more dimensions of the mobile structure, wherein the controller is configured to:
receive the one or more dimensions of the mobile structure from the memory; and
determine an avoidance course for the mobile structure to avoid the first and second avoidance areas, wherein the avoidance course is based, at least in part, on the one or more dimensions of the mobile structure.

13. The system of claim 1, further comprising the SPOS and the ranging sensor, wherein:
the mobile structure comprises a watercraft, aircraft, and/or motor vehicle;
the SPOS comprises a speed sensor, a global navigation satellite system (GNSS), an accelerometer, a gyroscope, and/or a compass; and
the ranging sensor comprises a radar system, an Automatic Identification System (AIS) receiver, and/or an Aircraft Communications Addressing and Reporting System (ACARS) receiver.

14. The system of claim 1, wherein:
the first and second avoidance areas comprise a limited avoidance area associated with the mobile target that is placed along the projected course and is configured to indicate a proximity of the mobile target to the mobile structure as the mobile structure approaches the projected course; and
the image data comprises the limited avoidance area.

15. A method comprising:
detecting, by a ranging sensor configured to be mounted to a mobile structure, a mobile target;
determining a projected course for the mobile target detected by the ranging sensor;
determining at least first and second avoidance areas based, at least in part, on the projected course for the mobile target and one or more dimensions of the mobile target wherein each of the first and second avoidance areas comprise an avoidance area length comprising an adjustable lead length extending along a direction of motion of the mobile target that is adjustable based, at least in part, on the projected course for the mobile target;
generating image data based, at least in part, on the projected course and the first and second avoidance areas, wherein the image data indicates at least the first and second avoidance areas; and
rendering the image data via at least one display of a user interface.

16. The method of claim 15, wherein the ranging sensor comprises a radar system configured to detect one or more relative positions and/or a cross section of the mobile target, the method further comprising:
receiving the one or more relative positions and/or the cross section of the mobile target from the radar system;
determining a velocity and/or an estimated size of the mobile target based, at least in part, on the received relative positions and/or cross section; and
determining the projected course and/or the first and second avoidance areas based, at least in part, on the determined velocity and/or the estimated size of the mobile target.

17. The method of claim 15, wherein the projected course comprises a velocity of the mobile target, the method further comprising:
determining one or more predicted collision points between the mobile target and the mobile structure and along the projected course based, at least in part, on the velocity of the mobile target; and
determining the first and second avoidance areas based, at least in part, on the one or more predicted collision points.

18. The method of claim 17, wherein the ranging sensor comprises an Automatic Identification System (AIS) receiver, the method further comprising:
determining the projected course for the mobile target from signals provided by the AIS receiver;
determining a clearance zone between the first and second avoidance areas; and
generating the image data based, at least in part, on the clearance zone.

19. The method of claim 17, wherein:
the one or more predicted collision points comprise first and second centroid predicted collision points between the mobile target and the mobile structure, and the method comprises determining the first and second avoidance areas based on extending the first and second centroid predicted collision points about the projected course according to the one or more dimensions of the mobile target and the adjustable lead length, wherein the adjustable lead length is based on the velocity of the mobile target and/or safety regulations associated with reducing a risk of collisions; or
the one or more predicted collision points each correspond to at least one of the one or more dimensions of the mobile target, and the method comprises determining the first and second avoidance areas based on determining positions for each of the one or more predicted collision points and grouping the positions for each of the one or more predicted collision points according to a corresponding predicted collision time and/or the one or more dimensions of the mobile target and the adjustable lead length, wherein the adjustable lead length is based on the velocity of the mobile target and/or safety regulations associated with reducing a risk of collisions.

20. The method of claim 15, wherein the ranging sensor comprises an Automatic Identification System (AIS) receiver, and the method further comprising:
receiving one or more dimensions of the mobile target from the AIS receiver;
determining the first and second avoidance areas based, at least in part, on the one or more dimensions of the mobile target and/or one or more characteristics of the mobile structure;
determining an avoidance course for the mobile structure to avoid the first and second avoidance areas;
generating the image data based, at least in part, on the avoidance course; and
piloting the mobile structure according to the avoidance course.

21. The method of claim 15, further comprising:
determining one or more predicted collision points between the mobile target and the mobile structure and along the projected course;
determining an interdiction course to one of the one or more predicted collision points; and piloting the mobile structure along the interdiction course to intercept the mobile target at the one of the one or more predicted collision points.

22. The method of claim 15, wherein the first avoidance area is further from the detected mobile target than the second avoidance area, the method further comprising:

determining first, second, and/or third clearance zones along the projected course that are outside the first and second avoidance areas, wherein the first clearance zone is farther from the detected mobile target than the first avoidance area, the second clearance zone is between the first avoidance area and the second avoidance area, and the third clearance zone is separate from the first and second clearance zones; and determining one or more avoidance courses for the mobile structure based, at least in part, on the first, second, and/or third clearance zones.

23. The method of claim 22, further comprising:

determining first, second, and/or third risks of collision associated with the mobile structure traversing the projected course through the first, second, and/or third clearance zones; and determining a recommended avoidance course comprising one of the one or more determined avoidance courses for the mobile structure based, at least in part, on the first, second, and/or third risks of collision.

24. The method of claim 15, wherein the generated image data is based, at least in part, on a speed, position, and/or orientation of the mobile structure provided by a speed, position, and/or orientation sensor (SPOS), the method further comprising:

determining an updated projected course for the mobile target detected by the ranging sensor, wherein the updated projected course comprises an updated position and/or velocity of the mobile target;

receiving an updated speed, position, and/or orientation of the mobile structure from the SPOS;

determining first and second updated avoidance areas based, at least in the part, on the updated projected course for the mobile target and/or the updated speed, position, and/or orientation of the mobile structure; and generating updated image data based, at least in part, on the updated projected course, the first and second updated avoidance areas, and/or the updated speed, position, and/or orientation of the mobile structure.

25. The method of claim 15, further comprising:

determining a turning rate of the mobile target based, at least in part, on the projected course of the mobile target;

determining a curvature for at least one of the first and second avoidance areas corresponding to the determined turning rate; and generating the image data based, at least in part, on the determined curvature of the at least one of the first and second avoidance areas.

26. The method of claim 15, further comprising:

receiving the one or more dimensions of the mobile structure; and determining an avoidance course for the mobile structure to avoid the first and second avoidance areas, wherein the avoidance course is based, at least in part, on the one or more dimensions of the mobile structure.

27. The method of claim 15, wherein:

the first and second first and second avoidance areas comprise a limited avoidance area associated with the mobile target that is placed along the projected course and is configured to indicate a proximity of the mobile target to the mobile structure as the mobile structure approaches the projected course; and the image data comprises the limited avoidance area.

* * * * *

UNITED STATES PATENT AND TRADEMARK OFFICE
CERTIFICATE OF CORRECTION

PATENT NO. : 10,431,099 B2
APPLICATION NO. : 14/966998
DATED : October 1, 2019
INVENTOR(S) : Peter A. Stewart, John Wellbelove and Mark Rivers Page 1 of 1

It is certified that error appears in the above-identified patent and that said Letters Patent is hereby corrected as shown below:

In the Specification

Column 5, Line 14, change "other, module" to --other module--.

Column 23, Line 3, change "AGARS" to --ACARS--.

In the Claims

Column 43, Line 42, Claim 15 change "target wherein" to --target, wherein--.

Signed and Sealed this
Tenth Day of December, 2019

Andrei Iancu
*Director of the United States Patent and Trademark Office*